US008230150B2

(12) United States Patent
Russo et al.

(10) Patent No.: US 8,230,150 B2
(45) Date of Patent: Jul. 24, 2012

(54) INTERFACE PROTOCOL AND API FOR A WIRELESS TRANSCEIVER

(75) Inventors: David W. Russo, Woodinville, WA (US); Gregory Ray Smith, Bellevue, WA (US); Uwe Pakendorf, Berlin (DE); Denny Gumlich, Konigs Wusterhausen (DE)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/242,348

(22) Filed: Sep. 23, 2011

(65) Prior Publication Data

US 2012/0017223 A1 Jan. 19, 2012

Related U.S. Application Data

(62) Division of application No. 12/163,026, filed on Jun. 27, 2008, now Pat. No. 8,060,681.

(60) Provisional application No. 60/990,365, filed on Nov. 27, 2007.

(51) Int. Cl.
*G06F 13/36* (2006.01)
*A63F 9/24* (2006.01)

(52) U.S. Cl. ........... 710/306; 463/39; 463/40; 710/8; 710/15; 710/62; 710/105; 713/300; 713/310; 713/320; 713/324; 714/10

(58) Field of Classification Search ............ 710/107, 710/306; 463/39, 40; 714/10; 713/300, 713/310, 320, 324
See application file for complete search history.

(56) References Cited

U.S. PATENT DOCUMENTS

| | | | |
|---|---|---|---|
| 4,739,324 A | 4/1988 | Miesterfeld et al. |
| 4,750,165 A | 6/1988 | Champagne et al. |
| 5,023,778 A | 6/1991 | Simon, Jr. et al. |
| 5,517,505 A | 5/1996 | Buchholz et al. |
| 5,696,766 A | 12/1997 | Yeung et al. |
| 5,758,073 A | 5/1998 | Liang et al. |
| 5,928,345 A | 7/1999 | Tetzlaff et al. |

(Continued)

FOREIGN PATENT DOCUMENTS

KR 10-2006-0064830 6/2006

(Continued)

OTHER PUBLICATIONS

Cross, P., "Zeroing in on ZigBee (Part 1): Introduction to the Standard," Circuit Cellar, http://www.circuitcellar.com/library/print/0205/Cross175/Cross-175.pdf, Issue 175, Feb. 2005, 16-23.

(Continued)

*Primary Examiner* — Brian Misiura
(74) *Attorney, Agent, or Firm* — Woodcock Washburn LLP

(57) ABSTRACT

A wireless protocol may be implemented in a smart transceiver device that contains the physical (PHY) and media access control (MAC) layers of the wireless protocol stack. In various embodiments, a serial peripheral interface (SPI) based design may be used. Disclosed is an embodiment of a protocol which may be used to provide control and data transfer to and from the smart transceiver. In particular, an exemplary format of the protocol, the commands, and responses is disclosed. In a further embodiment, an application programming interface (API) is disclosed. The API may provide hardware independent services that can be used to establish, maintain, and transport data to and from the system and the smart transceiver device. In particular, an exemplary and non-limiting set of services, function calls, configuration methods, events, and parameters is disclosed.

12 Claims, 17 Drawing Sheets

U.S. PATENT DOCUMENTS

| | | | |
|---|---|---|---|
| 6,022,274 | A | 2/2000 | Takeda et al. |
| 6,366,768 | B1 | 4/2002 | Tessier et al. |
| 6,468,160 | B2 | 10/2002 | Eliott |
| 6,496,487 | B2 | 12/2002 | Franz et al. |
| 6,496,498 | B1 | 12/2002 | Kockmann et al. |
| 6,505,095 | B1 | 1/2003 | Kolls |
| 6,511,378 | B1 | 1/2003 | Bhatt et al. |
| 6,622,925 | B2 | 9/2003 | Carner et al. |
| 6,690,719 | B1 | 2/2004 | Raphaeli et al. |
| 6,731,832 | B2 * | 5/2004 | Alvarez et al. .............. 385/16 |
| 6,761,635 | B2 | 7/2004 | Hoshino et al. |
| 7,050,409 | B1 | 5/2006 | O'Scolai et al. |
| 7,103,511 | B2 | 9/2006 | Petite |
| 7,120,427 | B1 | 10/2006 | Adams et al. |
| 7,120,854 | B2 | 10/2006 | Lu et al. |
| 7,218,612 | B2 | 5/2007 | Page et al. |
| 7,230,931 | B2 | 6/2007 | Struhsaker |
| 7,257,644 | B2 * | 8/2007 | Simonnet et al. ............ 709/238 |
| 7,323,991 | B1 | 1/2008 | Eckert et al. |
| 7,379,475 | B2 * | 5/2008 | Minami et al. ............... 370/469 |
| 7,394,781 | B2 | 7/2008 | Kwon |
| 7,395,385 | B2 * | 7/2008 | Cobley ......................... 711/158 |
| 7,408,878 | B2 | 8/2008 | Evans et al. |
| 7,413,513 | B2 | 8/2008 | Nguyen et al. |
| 7,453,833 | B2 | 11/2008 | Yi et al. |
| 7,552,042 | B1 | 6/2009 | Brebner et al. |
| 7,558,903 | B2 | 7/2009 | Kinstler |
| 2002/0070851 | A1 | 6/2002 | Raichle et al. |
| 2002/0077177 | A1 | 6/2002 | Elliott |
| 2002/0120795 | A1 | 8/2002 | Charlier |
| 2004/0071097 | A1 | 4/2004 | Halter et al. |
| 2004/0166823 | A1 | 8/2004 | Alderton |
| 2004/0174831 | A1 * | 9/2004 | Yi et al. ....................... 370/278 |
| 2005/0094591 | A1 | 5/2005 | Kwon |
| 2006/0058102 | A1 | 3/2006 | Nguyen et al. |
| 2006/0084504 | A1 | 4/2006 | Chan et al. |
| 2006/0115088 | A1 | 6/2006 | Valentine et al. |
| 2007/0086425 | A1 | 4/2007 | Leow et al. |
| 2007/0086601 | A1 | 4/2007 | Mitchler |
| 2007/0234136 | A1 | 10/2007 | Leef et al. |
| 2007/0243825 | A1 | 10/2007 | Olgaard et al. |
| 2007/0250212 | A1 | 10/2007 | Halloran et al. |
| 2007/0255884 | A1 | 11/2007 | Kinstler |
| 2008/0130648 | A1 | 6/2008 | Ra et al. |
| 2008/0183928 | A1 | 7/2008 | Devila et al. |
| 2009/0137318 | A1 | 5/2009 | Russo et al. |
| 2009/0138638 | A1 | 5/2009 | Russo et al. |
| 2009/0325704 | A1 | 12/2009 | Tom et al. |

FOREIGN PATENT DOCUMENTS

| | | |
|---|---|---|
| WO | WO 02/23356 | 3/2002 |
| WO | WO 2009/070460 | 6/2009 |

OTHER PUBLICATIONS

Wang et al., "Wireless Feedback Structural Control with Embedded Computing," Dept. of Civil and Environmental Engineering, Stanford University, University of Michigan and Department of Civil Engineering, National Taiwan University, http://eil.stanford.edu/publications/yang_wang/SPIE2006%20YW%20Submitted.pdf, 2006.

Smetana, A., "PSoC®-Based Low-Cost, Intelligent Network: Physical and Data Link Layers," Cypress Perform, http://www.psocdeveloper.com/uploads/tx-piapappnote/an2346_01.pdf, 2006, 1-16.

Park, P.G., "Protocol Design of Sensor Networks for Wireless Automation," Master's Degree Project, Sweden 2007, KTH Signals Sensors and Systems, http://www.s3.kth.se/~kallej/grad_students/park_thesis07.pdf, 1-71.

United States Patent and Trademark Office: Restriction Requirement dated Jan. 12, 2010, U.S. Appl. No. 12/163,880, filed Jun. 27, 2008.

PCT International Search Report mailed Jun. 19, 2009, in corresponding International Application No. PCT/US2008/083706.

Ansari, A., "Hardware Development of an Embedded Wireless Evaluation Board," A thesis submitted to the faculty of the University of North Carolina at Charlotte in partial fulfillment of the requirements for the degree of Master of Science in the Department of Electrical and Computer Engineering, http://www.coe.uncc.edu/~jmconrad/GradStudents/Thesis_Ansari.pdf, 2005., pp. 22-27.

"Checkpoint 3: Wireless Transceiver," University of California at Berkeley, College of Engineering: Department of Electrical Engineering and Computer Science, EECS 150 Fall 2007, http://www.ints.eecs.berkeley.edu/~cs150/fa07/Labs/Checkpoint3.doc , 2007 1-14.

Wang et al., "Design of a Low-Power Wireless Structural Monitoring System for Collaborative Computational Algorithms," Proceedings of SPIE 12th Annual International Symposium on Smart Structures and Materials, http://www.personal.umich.edu/~jerlynch/papers/SPIE2005Wang.pdf, Mar. 6-10, 2005, 12 pages.

"Serial Peripheral Interface Bus", www.en.wikipedia.org-wiki-Serial_PeripheraUnterface_Bus, accessed Jun. 17, 2010, 1 page.

Xilinx "CoolRunner Serial Peripheral Interface Master": Dated Dec. 13, 2002, 21 pages.

Microchip "SPI—Overview and Use of the PICmicro Serial Peripheral Interface"; no date provide, 46 pages.

"Characteristics of Serial Peripheral Interfaces (SPI) Timing Parameters of Optical Mouse Sensor"—Dated 2006, 7 pages.

"Realising the SPI communication in a multiprocessor system"—Dated Aug. 2007, 4 pages.

Texas Instruments "TMS320DM644X DMSoC Serial Peripheral Interface (SPI) User's Guide"; Dated Feb. 2007, 37 pages.

United States Patent and Trademark Office: Non-final Office Action dated Apr. 19, 2010, U.S. Appl. No. 12/163,880, filed Jun. 27, 2008.

United States Patent and Trademark Office: Non-final Office Action dated Mar. 3, 2011, U.S. Appl. No. 12/163,880, filed Jun. 27, 2008.

United States Patent and Trademark Office: Final Office Action dated Aug. 4, 2011, U.S. Appl. No. 12/163,880, filed Jun. 27, 2008.

Arshad et al., "Characteristics of Serial Peripheral Interfaces (SPI) Timing Parameters of Optical Mouse Sensor" ICSE 2006 Proceedings, 2006, pp. 576-582.

Szekacs et al., "Realising the SPI communication in a multiprocessor system" SISY 2007 International Symposium on Intelligent Systems and Informatics, Aug. 24-25, 2007, pp. 213-216.

* cited by examiner

Master with Data, Slave with command but no data

Master with data, Slave with data

INTERFACE PROTOCOL AND API FOR A WIRELESS TRANSCEIVER

CROSS-REFERENCE TO RELATED APPLICATIONS

This application is a divisional of U.S. application Ser. No. 12/163,026, filed Jun. 27, 2008 now U.S. Pat. No. 8,060,681, currently pending, and claims the benefit of U.S. Provisional Application No. 60/990,365, filed Nov. 27, 2007, the entirety of both are incorporated herein by reference.

This application is related by subject matter to the subject matter disclosed in the following commonly assigned application, the entirety of which is hereby incorporated by reference herein: U.S. patent application Ser. No. 12/163,880, filed Jun. 27, 2008, currently pending.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, 2007 Microsoft Corp.

FIELD OF TECHNOLOGY

The presently disclosed subject matter relates to the field of computing and electronics, and more particularly, to fields such as entertainment consoles, although these are merely exemplary and non-limiting fields.

BACKGROUND OF THE INVENTION

Video game and entertainment systems are increasingly incorporating wireless features and accessories. Development of the wireless radios and the necessary drivers require significant design effort. In turn, the commands and protocols required to control and manage the wireless interfaces can be complicated and require significant development resources for developers of software and hardware accessories for the wireless systems. Furthermore, wireless technologies and related standards change on a frequent basis, requiring developers to adapt to new interface requirements. Thus a developer's investment in developing products for a particular wireless interface may not be recouped when the interfaces and protocols frequently change.

Nevertheless, it would be advantageous to use an existing standard interface developing wireless features and accessories. An interface standard widely used in the industry and supported by a large number of products typically drive down costs, and incorporation of such off the shelf components is desirable to reduce the cost of product development. Furthermore, in the case of a wireless transceiver, it is typically desirable to limit the number of IC pins needed to support inter-processor communications, while at the same time providing sufficient data bandwidth. Therefore, a simple serial interface may be selected for a wireless architecture. One such standard interface commonly used and well known in the art that provides such features is the Serial Peripheral Interface (SPI). One limitation of the SPI interfaces is that data transfers are limited to 8 bits at one time. Because many applications may require higher command and data transfer capability, a higher level protocol is needed that has the advantages of a serial interface. Furthermore, it would advantageous to provide an interface that developers can use to utilize the wireless features, while not having to be concerned with the physical and transport details of the interface.

SUMMARY OF THE INVENTION

Various systems, methods, and computer readable instructions are disclosed herein for providing a platform to support the development of new wireless accessories for video game and entertainment systems using serial interfaces such as the Serial Peripheral Interface (SPI). In one exemplary and non-limiting aspect of the present disclosure, a smart transceiver device may contain the complete physical (PHY) and media access control (MAC) layers of the wireless protocol stack, and the wireless protocol functionality may be partitioned into a single device.

In various embodiments, a protocol is disclosed that may be used to provide control and data transfer to and from the smart transceiver device. In particular, an exemplary format for the protocol, the commands, and responses is disclosed.

In a further embodiment, an application programming interface (API) is disclosed to provide an interface for developers to provide a hardware independent set of services. Such an API may be used to establish, maintain, and transport data to and from the system and the smart transceiver device. Services may be invoked as desired by the API. In particular, an exemplary and non-limiting set of services, function calls, configuration methods, events, and parameters is disclosed.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION OF ILLUSTRATIVE EMBODIMENTS

Exemplary Game Console, PC, and Networking Aspects

Figure 1:
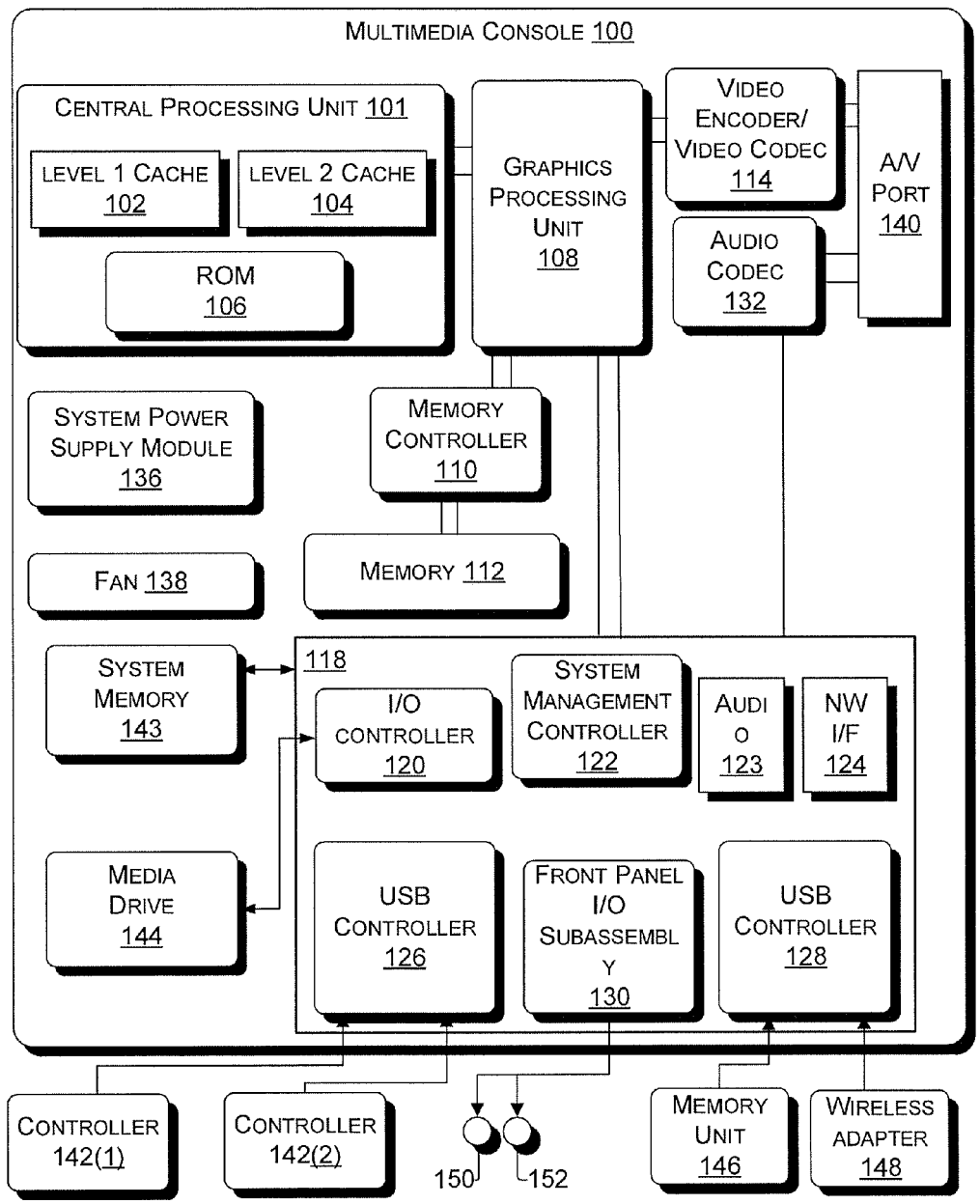
FIG. 1 illustrates an exemplary console for subject matter discussed herein.

This section of the present disclosure provides the general aspects of an exemplary and non-limiting game console. Referring now to FIG. 1, a block diagram shows an exemplary multimedia console. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a flash memory device (not shown). Furthermore, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity, 3D, surround, and stereo audio processing according to aspects of the present disclosure described above. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community. In this latter scenario, the console 100 may be connected via a network to a server, for example.

Figure 2:
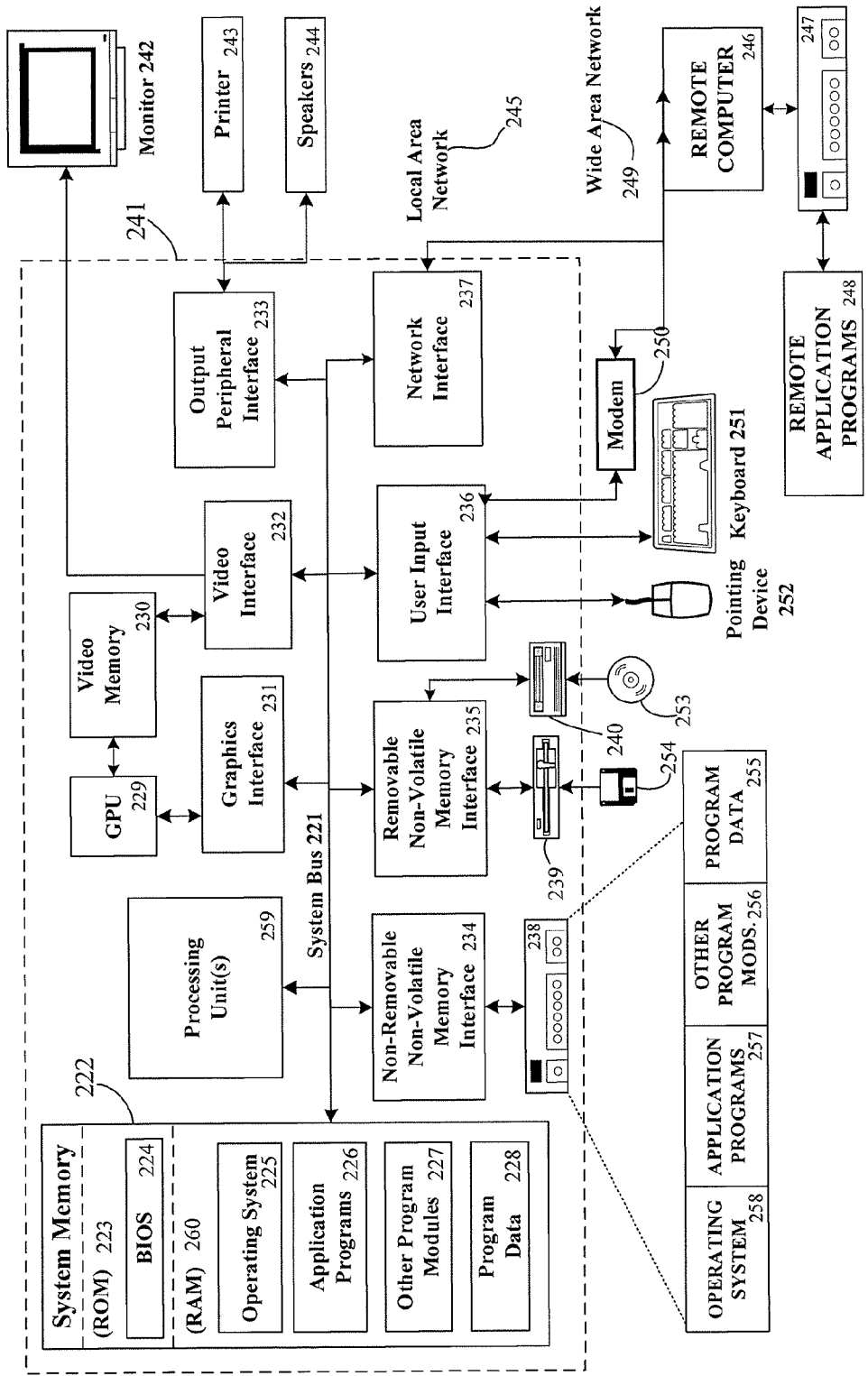
FIG. 2 illustrates an exemplary computing environment for subject matter discussed herein.

Second, now turning to FIG. 2, illustrated is a block diagram representing an exemplary computing device that may be suitable for use in conjunction with implementing the subject matter disclosed above. Numerous embodiments of the present disclosure may execute on a computer. For example, the computer executable instructions that carry out the processes and methods for providing PC experiences on gaming consoles may reside and/or be executed in such a computing environment as shown in FIG. 1. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 241 typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2, provide storage of computer readable instructions, data structures, program modules and other data for the computer 241. In FIG. 2, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It may be appreciated that the network connections shown are exemplary and other means of establishing a communications link between the computers may be used.

Figure 3:
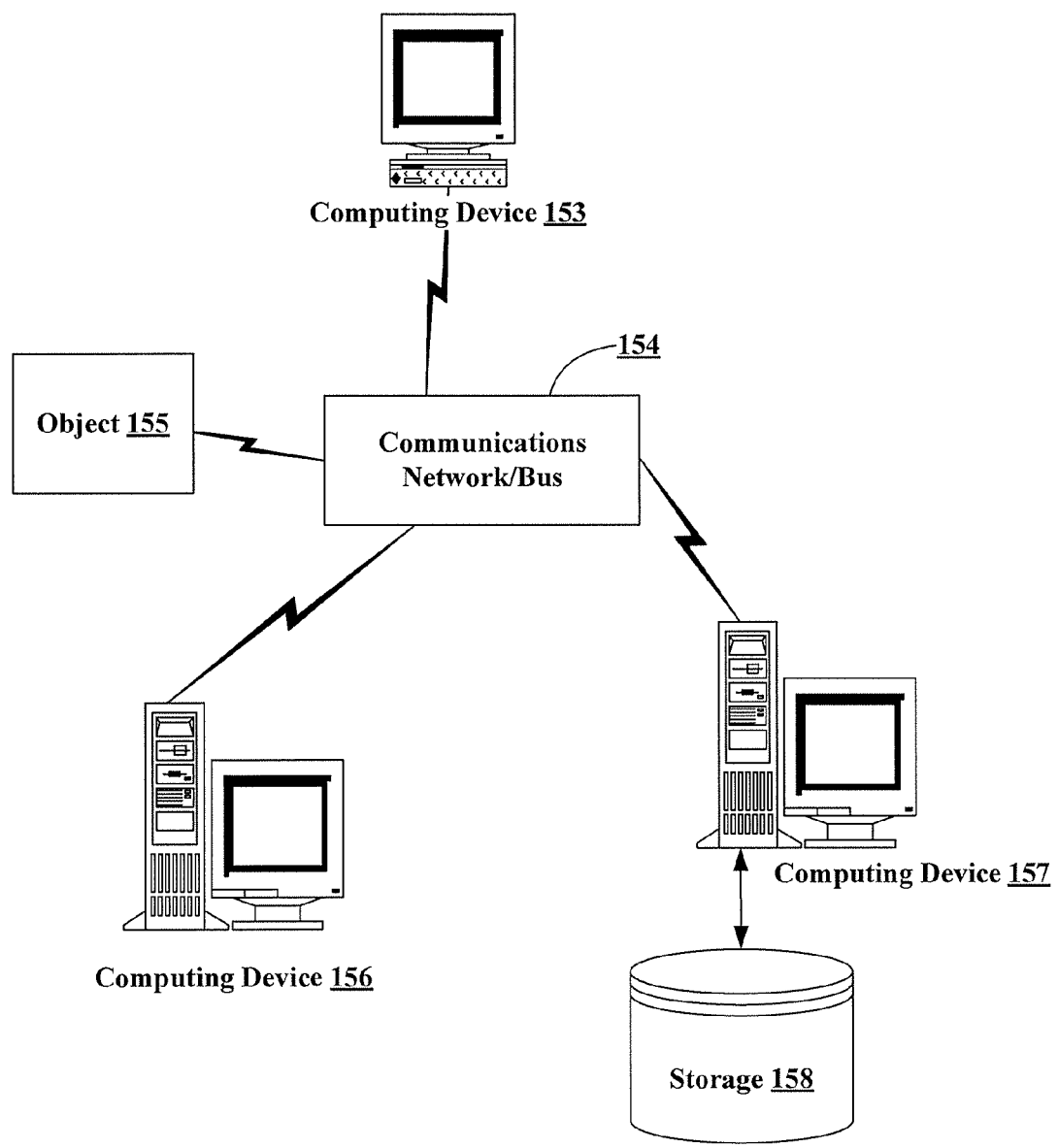
FIG. 3 illustrates an exemplary networking environment for subject matter discussed herein.

FIG. 3 provides a schematic diagram of an exemplary networked or distributed computing environment. The environment comprises computing devices 153, 156, and 157 as well as object 155 and database 158. Each of these entities 153, 155, 156, 157, and 158 may comprise or make use of programs, methods, data stores, programmable logic, etc. The entities 153, 155, 156, 157, and 158 may span portions of the same or different devices such as PDAs, audio/video devices, MP3 players, smart phones, DVD players, cable box tuners, or just about any computing devices capable of remoted content provided by server PCs. Each entity 153, 155, 156, 157, and 158 can communicate with another entity 153, 155, 156, 157, and 158 by way of the communications network 154. In this regard, any entity may be responsible for the maintenance and updating of a database 158 or other storage element.

This network 154 may itself comprise other computing entities that provide services to the system of FIG. 3, and may itself represent multiple interconnected networks. In accordance with an aspect of the presently disclosed subject matter, each entity 153, 155, 156, 157, and 158 may contain discrete functional program modules that might make use of an API, or other object, software, firmware and/or hardware, to request services of one or more of the other entities 153, 155, 156, 157, and 158.

It can also be appreciated that an object, such as 155, may be hosted on another computing device 156. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3, any entity 153, 155, 156, 157, and 158 can be considered a client, a server, or both, depending on the circumstances. And, moreover, regarding the entertainment console, it can be a client to a server.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 3 and the further diversification that can occur in computing in a network environment such as that of FIG. 3, the systems and methods provided herein cannot be construed as limited in any way to a particular computing architecture or operating system. Instead, the presently disclosed subject matter should not be limited to any single embodiment, but rather should be construed in breadth and scope in accordance with the appended claims. Thus, for example, although game consoles and server PCs have been discussed, just as easily full desktops could be remoted to smart phones as a means to access data and functionality that is otherwise unavailable to smart phones.

Finally, it should also be noted that the various techniques described herein may be implemented in connection with hardware or software or, where appropriate, with a combination of both. Thus, the methods, computer readable media, and systems of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present disclosure, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

An SPI Protocol and Command Structure

Various systems, methods, and computer readable instructions are disclosed herein for providing a platform to support the development of new wireless accessories for video game and entertainment systems. To limit the number of IC pins needed to support inter-processor communications, a simple serial interface may be used. In particular, to provide a common interface with as many off-the-shelf CPU parts as possible and to support the required data traffic, a Serial Peripheral Interface (SPI) based design may be implemented.

SPI is an interface that enables the serial exchange of data between a master and a slave device. SPI typically uses a synchronous protocol, where transmitting and receiving is guided by a clock signal generated by master microcontroller. The SPI interface allows the connection of several SPI devices while a master selects each device with a CS (Chip Select) signal.

SPI typically consists of four signal wires:
Master Out Slave In (MOSI)
Master In Slave Out (MISO)
Serial Clock (SCLK or SCK)
Chip Select (CS)

SPI is a synchronous serial data link standard. Devices communicate in a master/slave mode where the master device initiates the data frame. Multiple slave devices are allowed with individual chip select lines.

During each SPI clock cycle, a full duplex data transmission occurs, in which the master sends a bit on the MOSI line, the slave reads the bit from that same line, the slave sends a bit on the MISO line, and the master reads it from that same line. Transmissions typically involve two shift registers of a given word size, such as eight bits, one in the master and one in the slave. The shift registers are connected in a ring configuration.

Data is typically shifted out with the most significant bit first, while shifting a new least significant bit into the same register. After that register has been shifted out, the master and slave have exchanged register values. The process may then repeat as needed.

In one exemplary and non-limiting aspect of the present disclosure, a smart transceiver device may be provided to support the rapid development of new wireless accessories for gaming platforms. In an embodiment, a smart transceiver may provide receiver and transmitter functions for physical and link wireless communications layers. In particular, the PHY and Link layers of a wireless protocol stack, and wireless protocol functionality for such a device may be implemented in a wireless application specific integrated circuit (ASIC). In one embodiment, the smart transceiver may be the slave and a master control application may be the master of an SPI bus.

In an embodiment, wireless communication may be provided using a frequency hopping digital radio protocol with time-division multiplexed access (TDMA) granting radio time for each wireless accessory. The unlicensed worldwide 2.4 GHz Industrial Scientific Medical (ISM) radio band may be utilized. A minimum of external components may be needed to implement a complete Frequency Hopping Spread Spectrum (FHSS) 2.4 GHz ISM band digital radio transceiver compliant with worldwide regulatory requirements.

Figure 4:
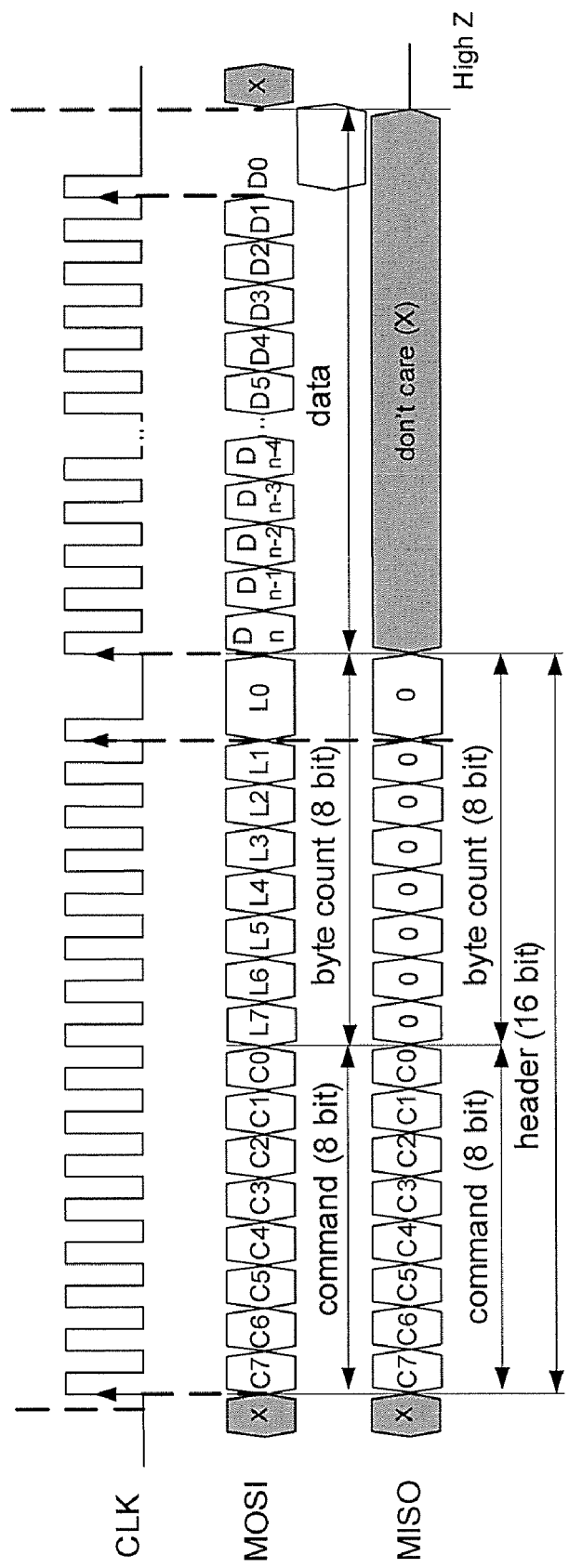
FIG. 4 illustrates an exemplary data transfer using an embodiment of a protocol disclosed herein.

A shortcoming of a standard SPI interface is that data transfers are limited to 8 bits at one time. Because many applications may require higher command and data transfer capability, a higher level protocol is needed that still retains the advantages of a serial interface. In consideration of an efficient control/data transport method across the SPI bus with full duplex data transfer, in various embodiments a frame based SPI protocol is disclosed that may be used to provide control and data transfer to and from the smart transceiver device. In particular, an exemplary format for the protocol, the commands, and responses is disclosed. In an embodiment, each frame may consist of a 2 byte header with a variable payload length. The header may comprise 2 parts—a command byte and a length byte. The length of the payload may be dependent upon the specific command, and the longest packet may define the length of the transfer. FIG. 4 provides and exemplary illustration of a typical data transfer.

Because the disclosed protocol comprises a full duplex interface, if one device has no information to transfer, the device may send an idle command. The disclosed protocol may maintain a master/slave structure, with a master control application typically controlling all transactions, and the master control application transferring data whenever it has a message ready to transmit. The smart transceiver may act as the slave device and may return a reply indicating either the result of the request, compliance to the command, or an indication of the occurrence of an event from a previous request. The smart transceiver may further generate an interrupt to the master control application indicating that a message is ready to be read by the master.

The disclosed protocol may further comprise the following rules that apply to a frame transaction. First, the chip select may be in an active state. Second, a header may always be transmitted first on both ends of the link. If one end has no valid message to transmit, the command field may be set to be 0x00. Third, the longest frame (master to slave or slave to master) may be used to define the length of the transfer. Fourth, if one side has more than one packet to send, the independent messages may be appended together within the same frame.

The cases depicted in the table below are all exemplary valid transfers.

| Case No. | Master data | Master no data | Slave data | Slave no data |
|---|---|---|---|---|
| 1 | X | | | X |
| 2 | | X[1] | | X |
| 3 | X | | X | |
| 4 | | X | X | |
| 5 | X[2] | | X[2] | |
| 6 | X[2] | | X[1] | |
| 7 | | X[3] | X[2] | |

[1] Single Command
[2] Multiple Data
[3] Dummy Command

Figure 5:
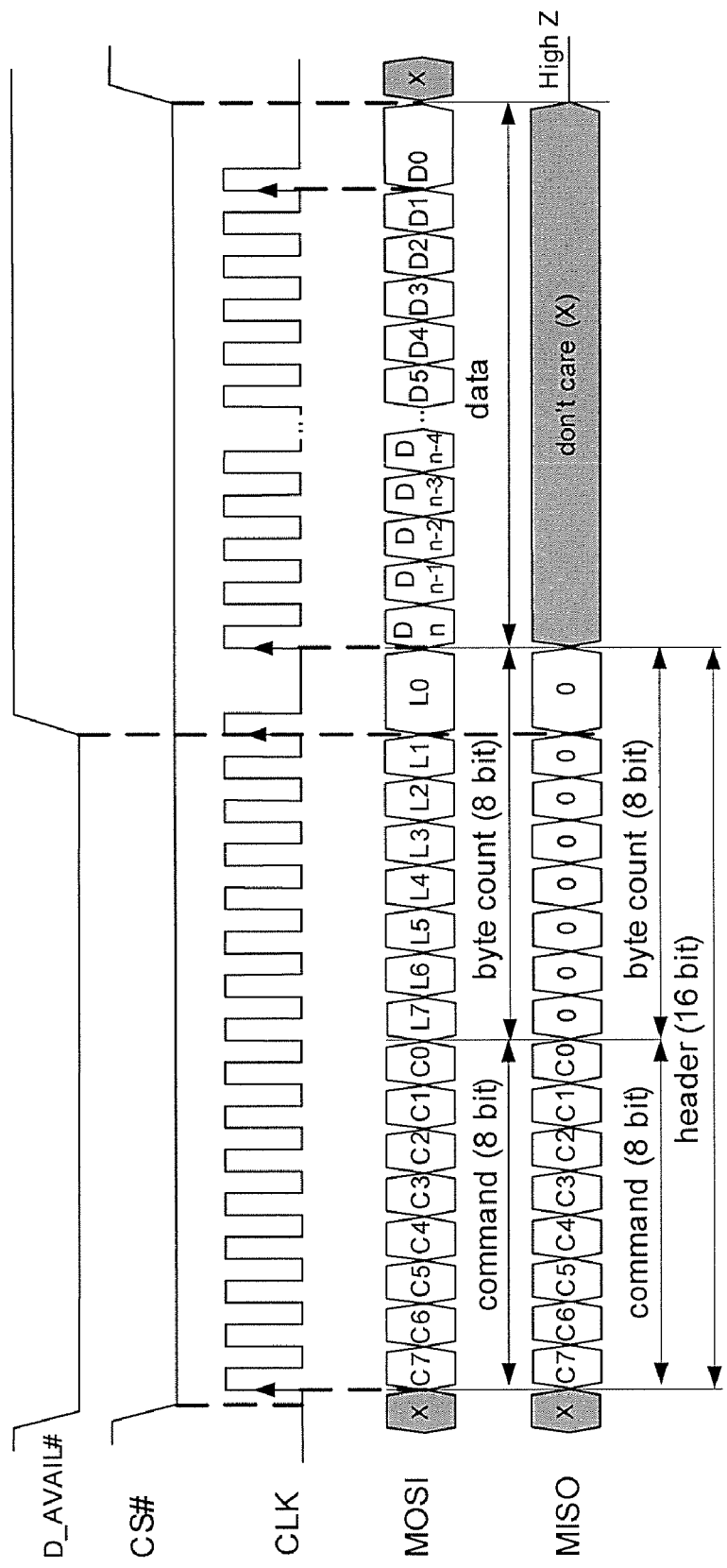
FIG. 5 illustrates an exemplary data transfer using an embodiment of a protocol disclosed herein.
Figure 6:
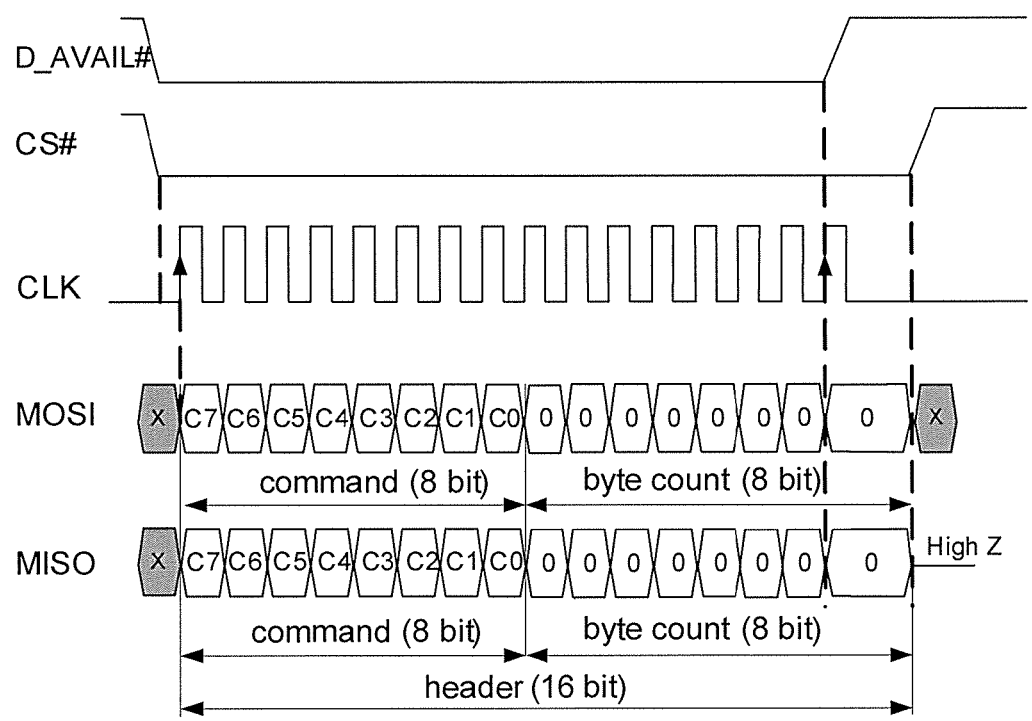
FIG. 6 illustrates an exemplary timing diagram depicting bus transfers using an embodiment of a protocol disclosed herein.
Figure 7:
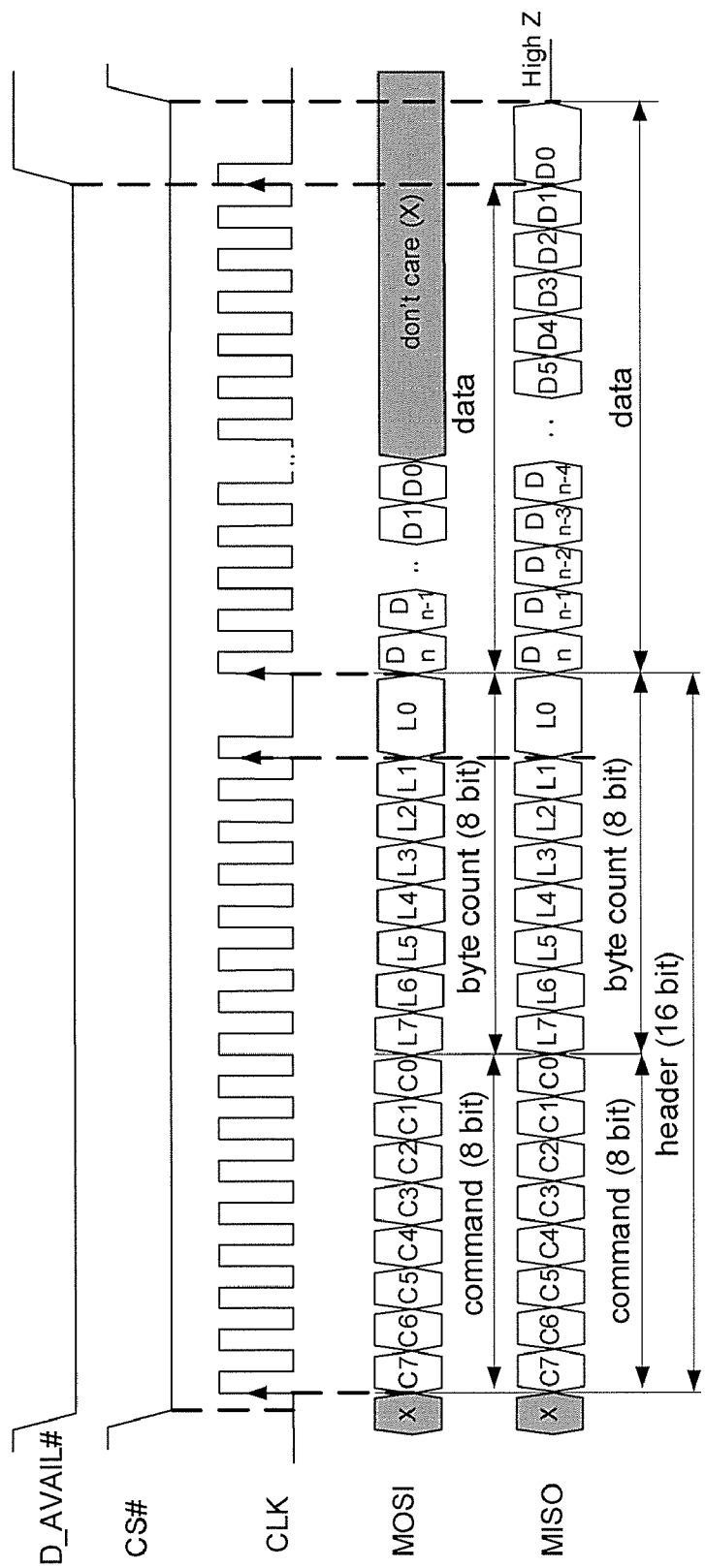
FIG. 7 illustrates an exemplary timing diagram depicting bus transfers using an embodiment of a protocol disclosed herein.
Figure 8:
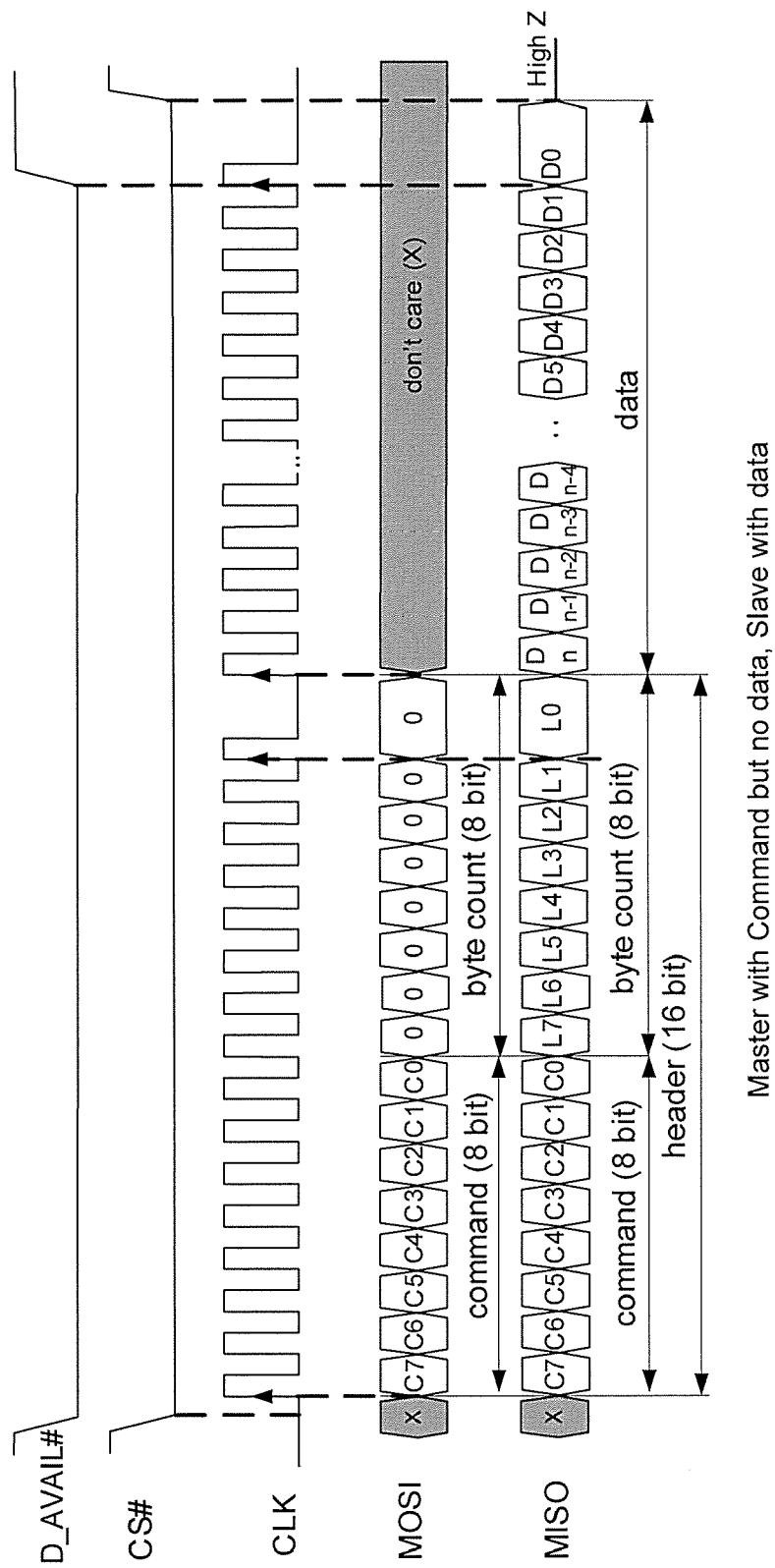
FIG. 8 illustrates an exemplary timing diagram depicting bus transfers using an embodiment of a protocol disclosed herein.
Figure 9:
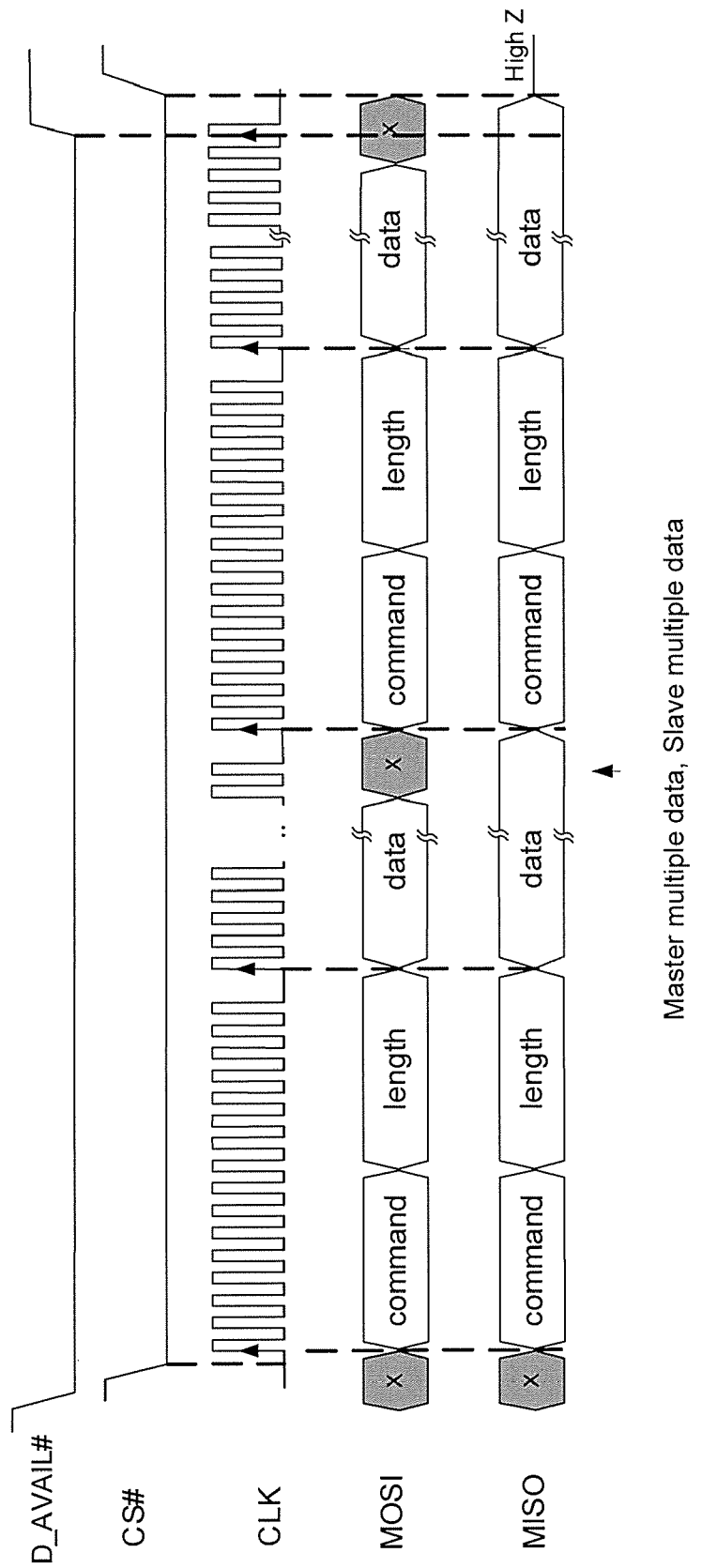
FIG. 9 illustrates an exemplary timing diagram depicting bus transfers using an embodiment of a protocol disclosed herein.
Figure 10:
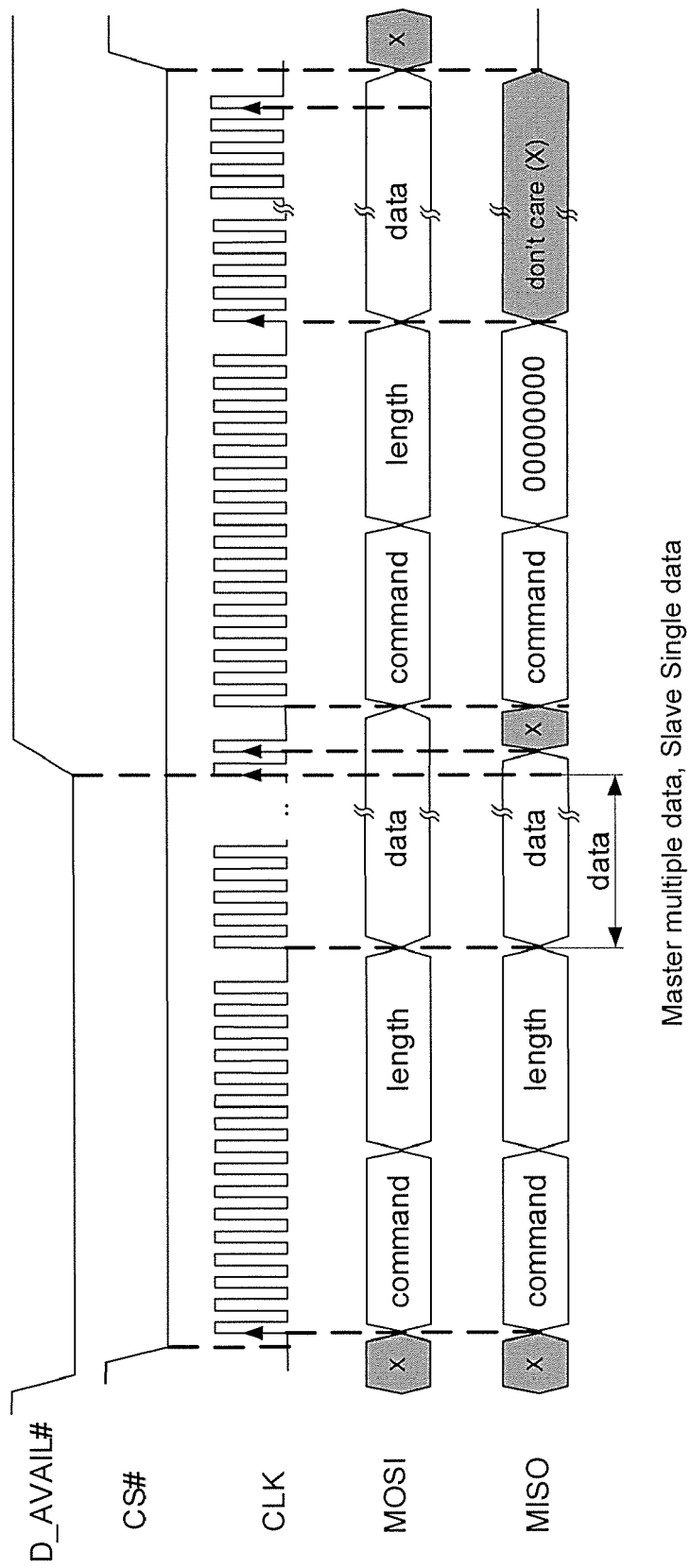
FIG. 10 illustrates an exemplary timing diagram depicting bus transfers using an embodiment of a protocol disclosed herein.
Figure 11:
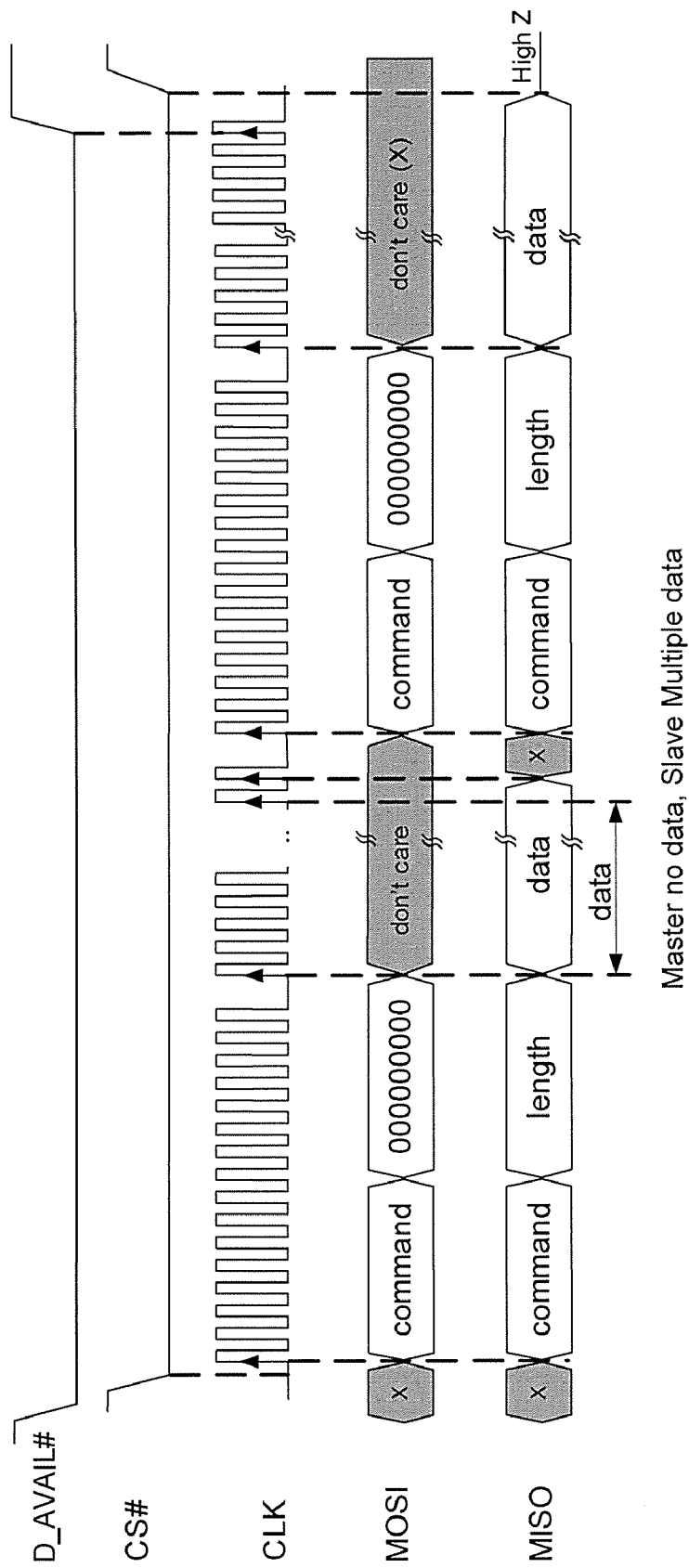
FIG. 11 illustrates an exemplary timing diagram depicting bus transfers using an embodiment of a protocol disclosed herein.

FIGS. 5-11 illustrate exemplary timing diagrams depicting bus transfers for the scenarios outlined in the table. FIG. 5 depicts a master with data to transmit and the slave with a command to transmit but no data. FIG. 6 depicts the master with a command to transmit but no data and the slave with no data. FIG. 7 depicts the master with data to transmit and the slave with data to transmit. FIG. 8 depicts the master with a command to transmit but no data and the slave with data. FIG. 9 depicts the master with multiple data packets and the slave with multiple data packets. FIG. 10 depicts the master with multiple data packets and the slave with a single data packet to transmit. Finally, FIG. 11 depicts the master with no data to transmit, and the slave with multiple data packets.

No guard time may be required after the frame header. A CS# transition low to high can be used for frame synchronization. To support SPI multi slave applications MISO pads may be set to tristate after data transfer is finished (triggered by CS#). Data bytes may be set to "don't care" after the number of data bytes defined by length bytes are transmitted.

In one embodiment, the smart transceiver functionality may be selected at startup. The functionality of the smart transceiver may be different depending upon the desired application. The functionality may further depend upon the product type the smart transceiver is used in. For example, if the IC is used in a voice only device, the IC may operate differently than if the product is a game controller device. The SPI command structure may change depending upon the type of application the smart transceiver is configured for.

The smart transceiver device may be designed to simultaneously support up to four data and voice accessories or four data-only and 4 voice-only accessories, or any combination in between. The smart transceiver, when implemented in a wireless accessory, may communicate with wireless video game consoles or a wireless enabled personal computer or other computing device that is equipped with a similar smart transceiver.

The smart transceiver may be a platform that may be used to support various product configurations. Firmware within the smart transceiver may be adjusted to support various product versions, without changing the chip hardware. In a video game system, the smart transceiver may be used to support video console products, game controller products, and various peripheral products.

Figure 12:
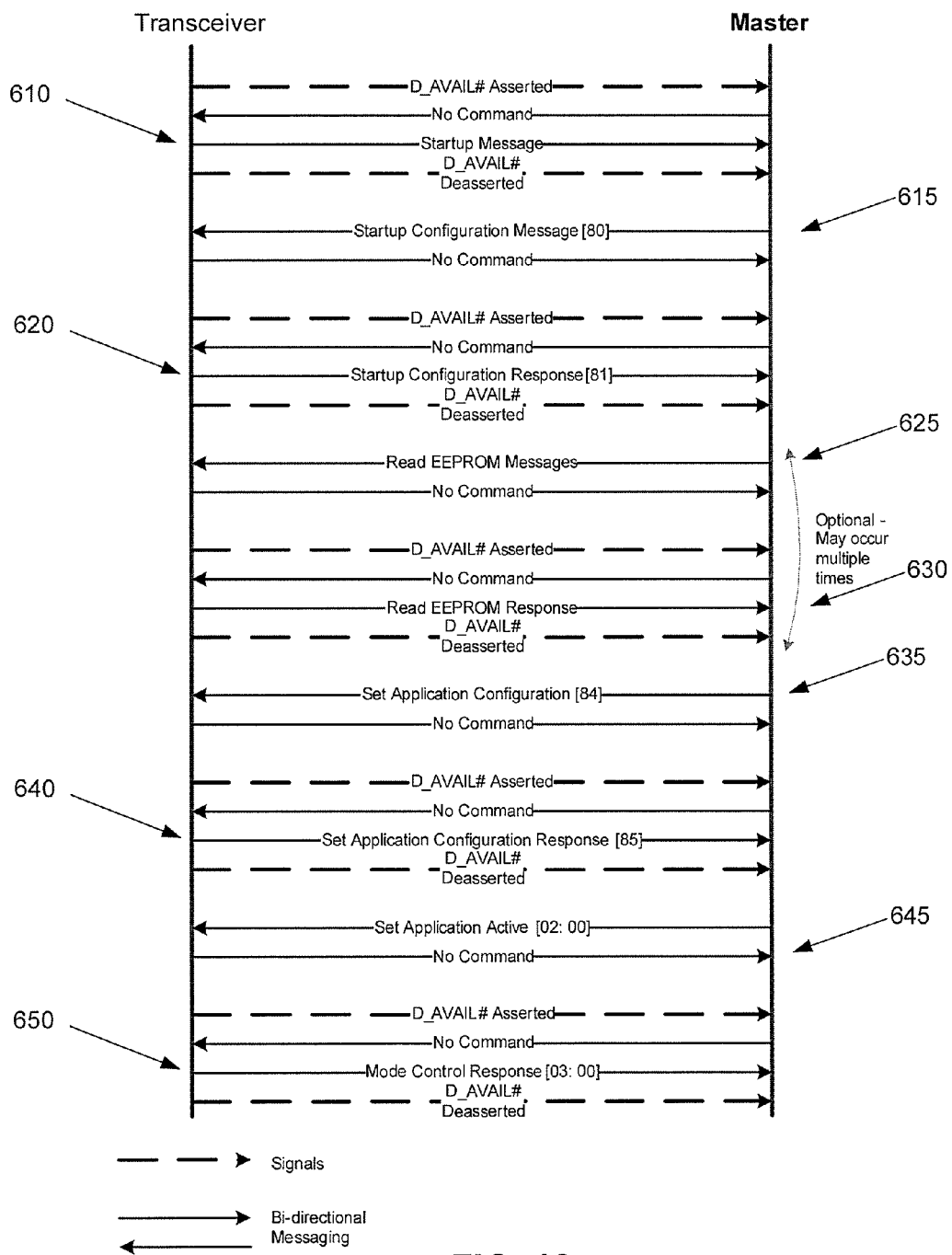
FIG. 12 provides an exemplary illustration of the startup signaling and messaging in an embodiment of the smart transceiver disclosed herein.

FIG. 12 provides an exemplary illustration of the startup signaling and messaging in an embodiment of the smart transceiver. Referring to the figure, the smart transceiver may 610 send the smart transceiver startup message. The master control application may then send a Startup Configuration message 615 to the smart transceiver. The Startup Configuration message may provide the smart transceiver with information about the general setup, including the SPI protocol being used, the output clock needed, the type of EEPROM storage and the length of the EEPROM used by the master control application.

The smart transceiver may respond with a Startup Configuration Response 620. The master control application may send commands 625 to retrieve EEPROM data for application configuration. If transmitted, the master control application may send the commands and wait for the responses from the smart transceiver 630.

The master control application may send an application configuration command 635. The application configuration command may set up the smart transceiver chip into the mode that the master control application needs. The smart transceiver may respond with the Application Configuration response 640.

The master control application may send the command to set the application to active 645. The smart transceiver may then respond with the current mode of "Application Active" 650.

In the configuration standby state, limited SPI commands may be allowed by the master control application. The smart transceiver typically does not have enough information to perform any functions at this point and needs the master control application to provide more data. Typically the only commands that may be allowed in this state are mode control (i.e., power, reset) and startup configuration messaging.

The pre-application state may be entered after the master control application sends a valid startup configuration message. This state may allow more SPI commands but the number may be limited because the application has not been established. The primary functionality of the allowed commands typically may be configuration reads, configuration setting and mode control. The smart transceiver may remain in this state until the master control application changes it to another state.

The application standby state may be entered after the master control application sets the application configuration. The application typically does not start until the master control application sets the state to active.

The application active state may be entered from the application standby state after the master control application sets the mode to active. The application active state is typically the normal operating mode of the device. The master control application may continue to issue commands that are allowed by the application.

The following is an exemplary list of messages that support smart transceiver functionality. The commands are depicted in two sets. The first set are commands that may be independent of the application. The second set depicts exemplary application specific commands. Typically, the command set may be a subset of a more complete command set.

The table below lists exemplary application independent commands. The command details (specific format and field means) are provided in Appendix A.

| Application Independent Messages | | | |
|---|---|---|---|
| Master control application to smart transceiver | | Smart transceiver to Master control application | |
| Command # | Description | Command # | Description |
| 0x00 | No Command or response is being sent | 0x01 | Message Fail |
| 0x02 | Mode Control | 0x03 | Mode Control Response |
| | | 0x05 | Buffer Warning |
| | | 0x07 | Buffer Warning cleared |
| 0x38 | Voice Sync Setup Request | 0x39 | Voice Sync Setup Response |
| | | 0x3B | Voice Sync Message |
| 0x3E | Set Voice Coding Type | 0x3F | Voice Coding Type Response |
| 0x44 | EEPROM Read Request | 0x45 | EEPROM Read Response |
| 0x46 | EEPROM Write Request | 0x47 | EEPROM Write Response |
| 0x80 | Startup Configuration Message | 0x81 | Startup Configuration Response |
| 0x82 | Smart transceiver Startup Message Request | 0x83 | Smart transceiver Startup Message |
| 0xB8 | Wireless Frame Sync Setup | 0xB9 | Wireless Frame Sync Setup Response |
| | | 0xBB | Wireless Frame Sync |
| 0xC0 | GPIO Setup | 0xC1 | GPIO Setup Response/status |
| 0xC2 | GPIO Read/Write Message | 0xC3 | GPIO status/Response Message |

A gamepad application may use a wireless protocol associated with gamepad handling. The voice part of the gamepad application may acquire the voice channel using gamepad rules. The table below shows the SPI messages that may be used by a gamepad application.

| Gamepad Application Messages | | | |
|---|---|---|---|
| Master control application to smart transceiver | | Smart transceiver to Master control applicaiton | |
| Command # | Description | Command # | Description |
| 0x08 | Controller Header Report Buffer | 0x09 | Controller Header Request Buffer |
| 0x0A | Generic Report Buffer | 0x0B | Generic Request Buffer |
| 0x0C | Controller Data Buffer | 0x0D | Controller Data Buffer |
| 0x0E | Plug-In Module Buffer | | |
| 0x12 | Controller Transport Buffer | 0x13 | Controller Transport Buffer |

Gamepad Application Messages (continued)

| Master control application to smart transceiver | | Smart transceiver to Master control applicaiton | |
|---|---|---|---|
| Command # | Description | Command # | Description |
| 0x14 | Voice Header Report Buffer | 0x15 | Voice Header Request Buffer |
| 0x16 | Voice Transport Data | 0x17 | Voice Transport Data |
| 0x28 | Voice Data - PCM - Packet 0 | 0x29 | Voice Data - PCM - Packet 0 |
| 0x2A | Voice Data - PCM - Packet 1 | 0x2B | Voice Data - PCM - Packet 1 |
| 0x2C | Voice Data - PCM - Packet 2 | 0x2D | Voice Data - PCM - Packet 2 |
| 0x2E | Voice Data - PCM - Packet 3 | 0x2F | Voice Data - PCM - Packet 3 |
| 0x30 | Voice Data - PCM - Packet 4 | 0x31 | Voice Data - PCM - Packet 4 |
| 0x32 | Voice Data - PCM - Packet 5 | 0x33 | Voice Data - PCM - Packet 5 |
| 0x34 | Voice Data - PCM - Packet 6 | 0x35 | Voice Data - PCM - Packet 6 |
| 0x36 | Voice Data - PCM - Packet 7 | 0x37 | Voice Data - PCM - Packet 7 |
| 0x42 | Link Status Request | 0x43 | Link Status |
| 0x84 | Configuration Request | 0x85 | Configuration Response |
| 0xE0 | Data Connection Request | 0xE1 | Data Connection Response |
| 0xE2 | Voice Connection Request | 0xE3 | Voice Connection Response |

A voice device application may use a wireless protocol associated with a voice device. The voice part of the wireless application may acquire the voice channel using voice rules. The table below shows exemplary SPI messages used by a voice application.

Voice Application Messages

| Master control application to smart transceiver | | Smart transceiver to Master control application | |
|---|---|---|---|
| Command # | Description | Command # | Description |
| 0x14 | Voice Header Report Buffer | 0x15 | Voice Header Request Buffer |
| 0x16 | Voice Transport Data | 0x17 | Voice Transport Data |
| 0x28 | Voice Data - PCM - Packet 0 | 0x29 | Voice Data - PCM - Packet 0 |
| 0x2A | Voice Data - PCM - Packet 1 | 0x2B | Voice Data - PCM - Packet 1 |
| 0x2C | Voice Data - PCM - Packet 2 | 0x2D | Voice Data - PCM - Packet 2 |
| 0x2E | Voice Data - PCM - Packet 3 | 0x2F | Voice Data - PCM - Packet 3 |
| 0x30 | Voice Data - PCM - Packet 4 | 0x31 | Voice Data - PCM - Packet 4 |
| 0x32 | Voice Data - PCM - Packet 5 | 0x33 | Voice Data - PCM - Packet 5 |
| 0x34 | Voice Data - PCM - Packet 6 | 0x35 | Voice Data - PCM - Packet 6 |
| 0x36 | Voice Data - PCM - Packet 7 | 0x37 | Voice Data - PCM - Packet 7 |
| 0x42 | Link Status Request | 0x43 | Link Status |
| 0x84 | Configuration Request | 0x85 | Configuration Response |
| 0xE2 | Voice Connection Request | 0xE3 | Voice Connection Response |

Application Programming Interface (API)

Next, the API is described. In one embodiment, the slave device may be comprised of an application processor (AP) and the smart transceiver as a wireless protocol processor. The API may be located in the application processor. The two processors may be connected via a Serial Peripheral Interface (SPI).

Figure 13:
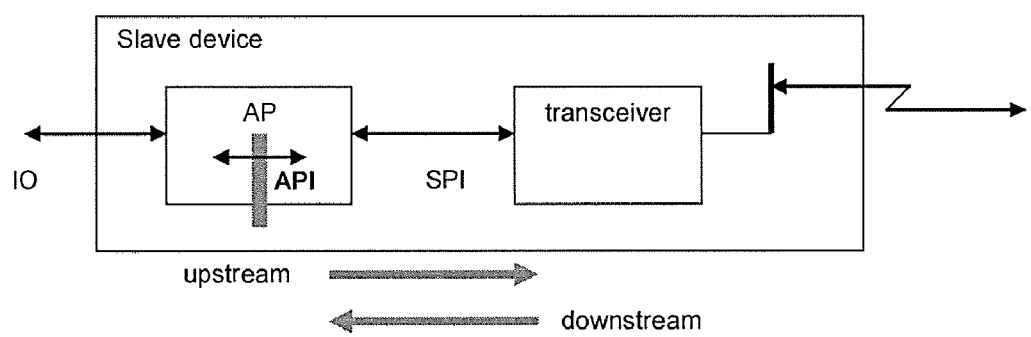
FIG. 13 illustrates an example of a system suitable for using an embodiment of a protocol disclosed herein.

As shown in FIG. 13, while the services may be provided independently of the actual hardware and software environment, in one embodiment the API may assume a separate application processor (master control application processor) communicating via a serial interface with the smart transceiver. Furthermore, in another embodiment the API may be used by a generic GPIO application.

In one embodiment the API may handle access to the physical radio channel and to the smart transceiver pins. The API may further be responsible for the following tasks:

1. Communication with the smart transceiver via the SPI using the SPI driver.
2. Simplifying setup of the smart transceiver.
3. Synchronizing power modes and functional states between the application and the smart transceiver.
4. Providing a framework for the wireless data and voice transmission functions of the application.
5. Supporting the debugging of the application's communication with the smart transceiver.

Five groups of API services may be considered:
1. A data service to transmit and receive fixed size data packets via a wireless link.
2. A voice service to transmit and receive voice packets via a wireless link. Special mechanisms may be included to support the isochronous property of this service and to support encoding or decoding of the voice samples.
3. A layer management service to configure parameters of the other services.
4. A GPIO service to perform bit oriented IO on some spare pins of the smart transceiver.
5. A production test service to provide the application to access to a smart transceiver production test interface.

Figure 14:
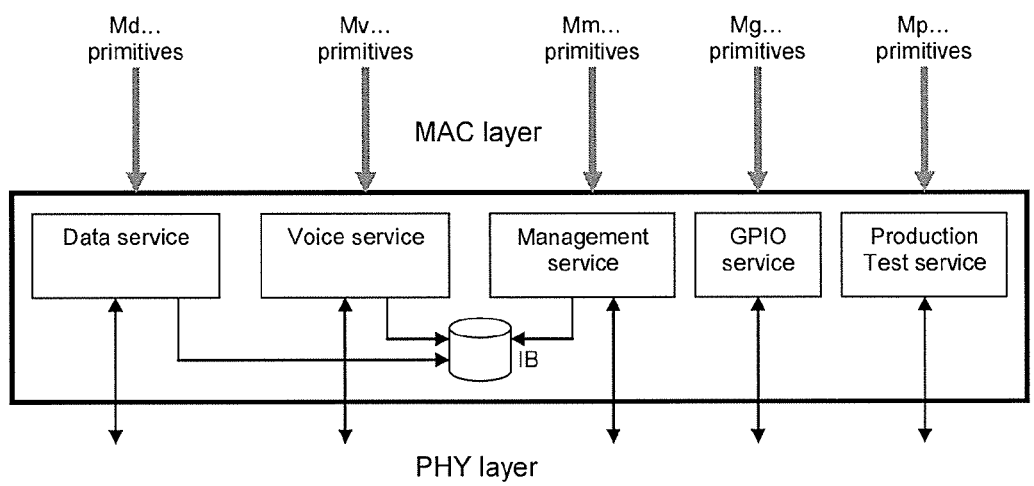
FIG. 14 illustrates data communication services using service primitives using an embodiment of a protocol disclosed herein.

A data communication service may be defined in terms of service primitives as exemplified in FIG. 14. A service primitive is an abstract interaction between the service providing layer and any service user (task, layer, etc.). As such it may be independent of software implementation details. The service may be implemented as a function call or an operating system message as appropriate for the target system.

Figure 15:
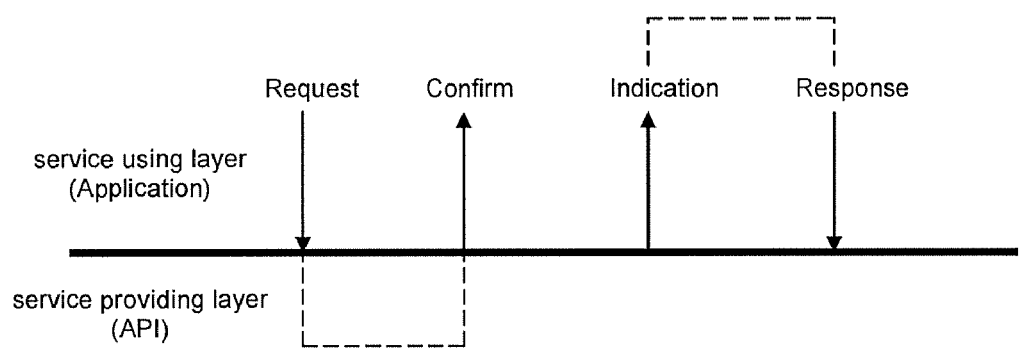
FIG. 15 illustrates API parameters and configuration values using an embodiment of a protocol disclosed herein.

As shown in FIG. 15, the Information Base (IB) may contain API parameters and configuration values. A service primitive may be one of four generic types:

Request: The request primitive may be passed down from the service using layer to request that a service initiated by the API.

Indication: The indication primitive may be passed up from the API. This event may be logically related to a remote service request, or it may be caused by an internal API event.

Confirm: The confirm primitive may be passed from the API to the Application/Network layer to convey the results of one or more associated previous service requests.

Response: The response primitive may be passed from the service using layer to the API to complete a procedure previously invoked by an indication primitive.

The following convention may be used for primitives: <primitive name> <primitive type>. The <primitive type> may be one of the following: Req, Ind, Conf or Resp.

The service primitives may provide the following functions:

... Data ... : Transmission of data packets with various fixed sizes.

... Connect ... : Connection establishment.

... Disconnect ... : Connection release.

An exemplary list of packet types for the upstream data service are shown below. All types may be used in arbitrary sequence. The maximum upstream throughput may be given as 48 bytes per frame (plus up to 16 bits in the header). The frame duration may be 8 ms. The total requested throughput typically does not exceed the maximum. For pure wireless voice devices (e.g. headsets) the ... DATA_VOICE ... packet types may be used.

For voice service, the service primitives provide the following functions:

... TxRx ... : Indicates the transmission timing of the PCM voice packets. The actual voice packets are exchanged by means of the special function GetVoiceBuffer ... Connect ... : Connection establishment.

... Disconnect ... : Connection release.

... SampleRate ... : Indicates an upstream sample rate change.

The PCM data therefore may be encoded by the smart transceiver to satisfy the throughput restrictions. PCM voice samples may be transferred 16 bit per sample (left justified, 2's complement, little-endian format).

The sample rate may be changed any time by the master device. A sample rate indication may be provided for this case, to trigger the audio handler to change the AD conversion parameters accordingly.

The upstream voice packet size (attribute IB_VOICE_PACKET_SIZE) and the initial upstream encoding type (attribute IB_UPSTREAM_VOICE_ENCODING_TYPE) may be setup in the IB header file.

The management services may combine primitives not directly related to data or voice transmission services and the layer configuration via the information base (IB). In typical application environments the IB attributes have fixed values and need not be changed during application execution.

| Packet type | Description | Flow control | smart transceiver buffer type |
|---|---|---|---|
| Upstream Data Service | | | |
| XAIR_UP_DATA_CONTROLLER_HEADER_REPORT | | No | Controller header report |
| XAIR_UP_DATA_CONTROLLER_DATA | 19 byte | No | Controller data |
| XAIR_UP_DATA_CONTROLLER_TRANSPORT | 24 byte | No | Controller transport |
| XAIR_UP_DATA_GENERIC_REPORT | 24 byte | Yes | Generic report |
| XAIR_UP_DATA_VOICE_HEADER_REPORT | 2 byte | No | Voice header report |
| XAIR_UP_DATA_VOICE_TRANSPORT | 24 byte | No | Voice transport report |

Most upstream packet types and the corresponding data (sub-) services do not provide any packet queuing or flow control on the radio link. These data packets are assumed rewriteable. When rewriteable packets are sent faster than the available throughput permits, a packet sent later may overwrite a packet sent earlier. Rewriteable packets are typically used to periodically transmit some state information.

An exemplary list of packet types for the downstream data service are listed. All types may be used in arbitrary sequence. The maximum downstream throughput may be given as 8 bytes per frame (plus up to 16 bits in the header). The frame duration may be 8 ms. The total throughput typically does not exceed the maximum. For pure wireless voice devices (e.g. headsets) the ... DATA_VOICE ... packet types may be used.

The management service primitives may provide the following functions:

... Init ... : API software initialization.

... Start ... : Starts communication with the smart transceiver.

... Reset ... : API and smart transceiver reset.

... PowerDown ... : smart transceiver power down.

... Bind ... : Master/slave binding (prerequisite for connections but only needed once).

... StopBind ... : Stops binding.

... Read ... : smart transceiver EEPROM read.

... Write ... : smart transceiver EEPROM write.

The IB attributes may also be accessed by corresponding primitives (get and set) as an option for further extension.

| Packet type | Description | smart transceiver buffer type |
|---|---|---|
| Downstream Data Service | | |
| XAIR_DOWN_DATA_CONTROLLER_HEADER_REQUEST | 2 byte | Controller header request |
| XAIR_DOWN_DATA_CONTROLLER_DATA | 8 byte | Controller data |
| XAIR_DOWN_DATA_CONTROLLER_TRANSPORT | 8 byte | Controller transport |
| XAIR_DOWN_DATA_GENERIC_REQUEST | 8 byte | Generic request |
| XAIR_DOWN_DATA_VOICE_HEADER_REQUEST | 2 byte | Voice header request |
| XAIR_DOWN_DATA_VOICE_TRANSPORT | 8 byte | Voice transport request |

Then the IB access primitives may have separate confirm primitives because in most cases a communication with the smart transceiver involved.

The smart transceiver may have spare GPIO pins that can be used for either inputs or outputs. The configuration may be done via IB attributes.

The service primitives may set or clear up to 16 IO pins or deliver the current state of up to 16 IO pins either on request (with the confirm primitive) or unsolicited (with the indication primitive).

Figure 16:
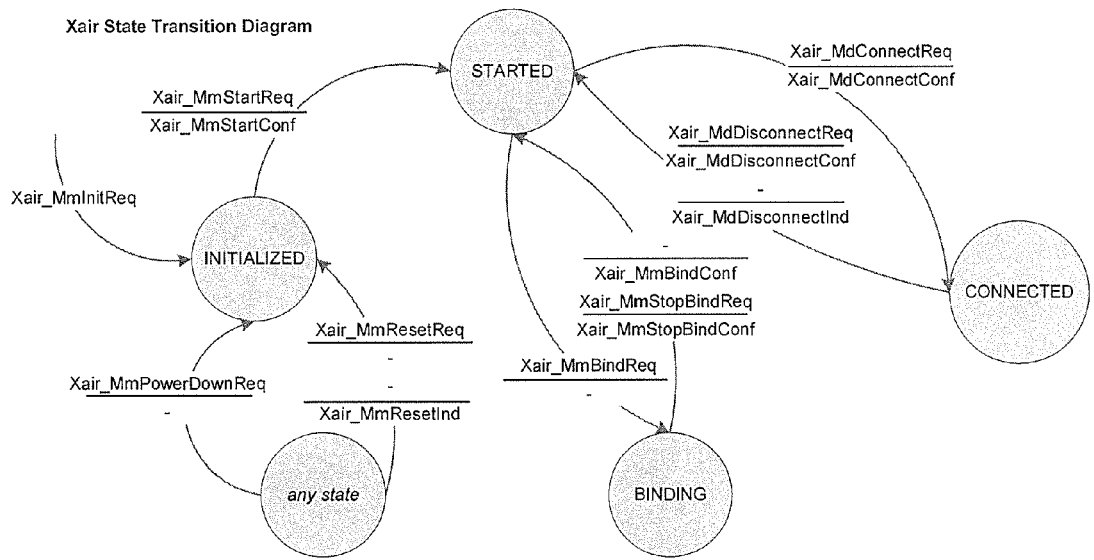
FIG. 16 illustrates a simplified state transition diagram of an embodiment of a protocol disclosed herein.

FIG. 16 depicts a simplified state transition diagram for an embodiment of an API protocol. The API states may be defined as:

INITIALIZED: The API is ready to be used.

STARTED: The communication with the smart transceiver is established and configured.

CONNECTED: A data and/or voice connection is established and data and/or voice may be sent or received. To simplify the state diagram there is no voice connection state or transition shown, but may exist as a separate independent instance.

BINDING: This is a transient state during binding to the master device. It is usually not necessary to do a binding just to get to the CONNECTED state. It may very well happen only once in the lifetime of a slave device.

Figure 17:
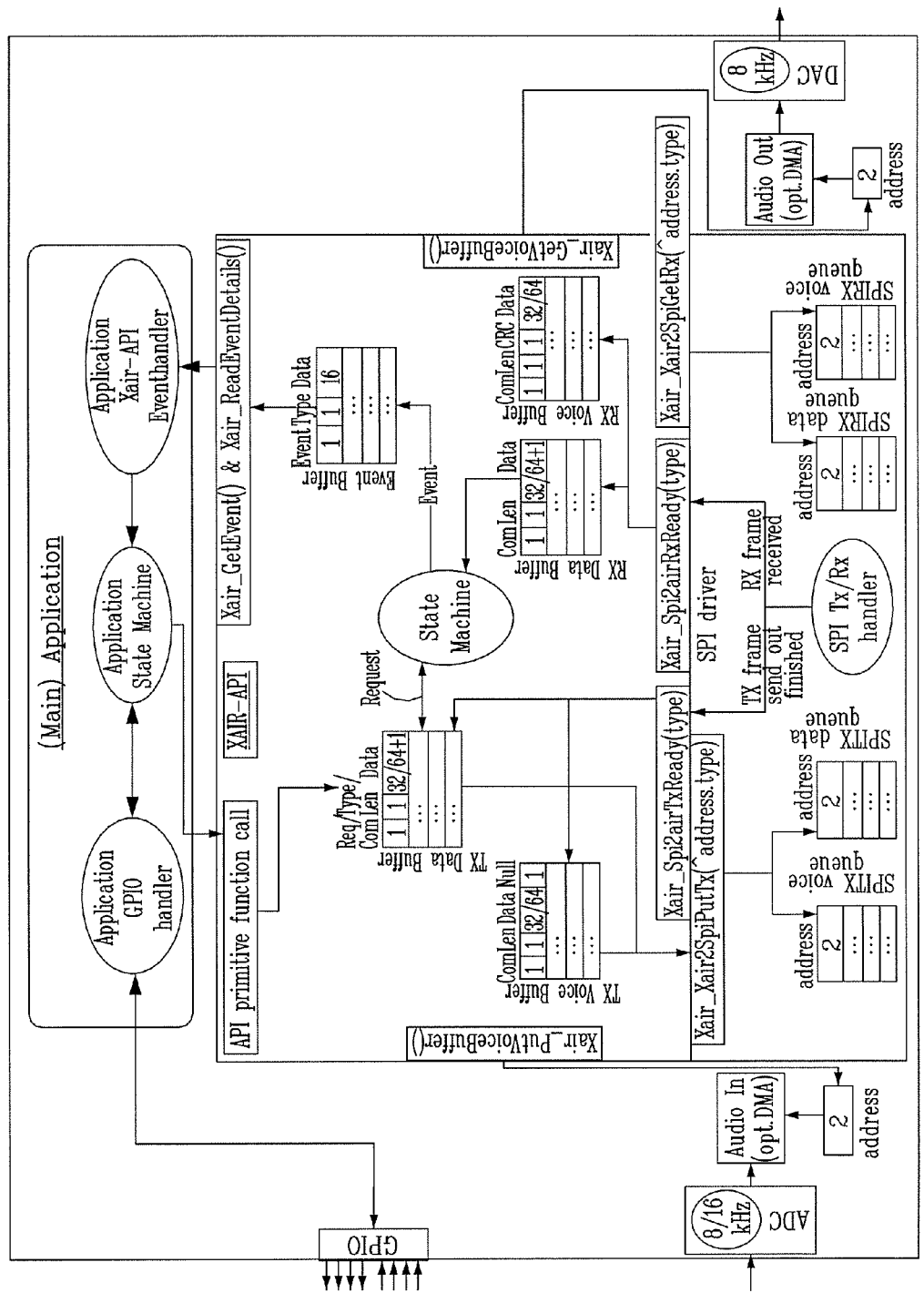
FIG. 17 illustrates an example structure of an embodiment of an API disclosed herein.

An exemplary basic structure of the API is shown in FIG. 17. Depicted is a state machine, which may handle the requests by the application, generate events for the application depending on received SPI messages by the smart transceiver, and the internal state. Buffering for transferring data and voice between master control application controller and the smart transceiver may be integrated in the API. The application layer may communicate with the API regarding primitive function calls to send out requests. In addition, in one embodiment there are two functions GetEvent( . . . ) and ReadEventDetails( . . . ) for handling event messages from the API. For voice handling two functions PutVoiceBuffer( . . . ) and GetVoiceBuffer( . . . ) may be implemented. The SPI driver may be interfaced to the API with four functions to process the API buffer.

Two types of requests may be considered:
1. Requests that may not have a corresponding confirm. The outcome of a requested operation is typically known after the return of the function call.
2. Requests that may have a corresponding confirm. For these types of requests there may be two different ways to handle operations: Synchronous or asynchronous. For a synchronous implementation the outcome of the function call may be known after the return of the function call, but the function may wait for the confirm and the calling task may be blocked until the function returns. In contrast, an asynchronous implementation may have a function call that returns immediately, but the outcome of the operation may be processed separately.

Indications and confirms may be received by the application as events (event identifier and list of pointers to the received primitive elements). Function calls may be available to get an event and to read the event details. To optimize the voice processing task the buffer management for voice samples may be handled by a separate function call instead of an event. With an underlying Operating System this may be implemented with messages received by tasks or threads.

Instead of having an event loop for the reception of indications and confirms, call-back functions may be registered with the API. When the respective indication or confirm is received the corresponding function may be called.

The following table cross references SPI commands available to users and third party applications to the primitives discussed herein. If a primitive is listed more than once the relevant command is selected according to a primitive parameter (e.g. Xair_MdDataReq) or an internal driver state (e.g. Xair_MmStartReq). Commands marked as FFS are currently not included in the specification but may be added as desired.

| Cross reference between SPI commands and primitives | | | |
|---|---|---|---|
| Command | Description | Direction | Primitive |
| 0x00 | No command | both | n/a (basic SPI driver function) |
| 0x01 | Message Fail | A→B | n/a (basic SPI driver function) |
| 0x02 | Mode Control Request | B→A | Xair_MmStartReq |
| | | | Xair_MmResetReq |
| | | | Xair_MmPowerDownReq |
| 0x03 | Set Mode Response | A→B | Xair_MmStartConf |
| 0x05 | Buffer Warning | A→B | n/a (basic SPI driver function) |
| 0x07 | Buffer Warning Cleared | A→B | n/a (basic SPI driver function) |
| 0x08 | Controller Header Report Buffer - Device 0 | B→A | Xair_MdDataReq |
| 0x09 | Controller Header Request Buffer - Device 0 | A→B | Xair_MdDataInd |
| 0x0A | Generic Report Buffer - Device 0 | B→A | Xair_MdDataReq |
| 0x0B | Generic Request Buffer - Device 0 | A→B | Xair_MdDataInd |
| 0x0C | Controller Data Buffer - Device 0 | B→A | Xair_MdDataReq |
| 0x0D | Controller Data Buffer - Device 0 | A→B | Xair_MdDataInd |
| 0x14 | Voice Header Report Buffer - Device 0 | B→A | Xair_MdDataReq |
| 0x15 | Voice Header Request Buffer - Device 0 | A→B | Xair_MdDataInd |
| 0x16 | Voice Transport Data - Device 0 | B→A | Xair_MdDataReq |
| 0x17 | Voice Transport Data - Device 0 | A→B | Xair_MdDataInd |
| 0x28 | Voice Data - PCM - Packet 0 - Device 0 | B→A | Xair_MvTxRxInd |
| 0x29 | Voice Data - PCM - Packet 0 - Device 0 | A→B | Xair_MvTxRxInd |
| 0x2A | Voice Data - PCM - Packet 1 - Device 0 | B→A | Xair_MvTxRxInd |
| 0x2B | Voice Data - PCM - Packet 1 - Device 0 | A→B | Xair_MvTxRxInd |
| 0x2C | Voice Data - PCM - Packet 2 - Device 0 | B→A | Xair_MvTxRxInd |
| 0x2D | Voice Data - PCM - Packet 2 - Device 0 | A→B | Xair_MvTxRxInd |
| 0x2E | Voice Data - PCM - Packet 3 - Device 0 | B→A | Xair_MvTxRxInd |
| 0x2F | Voice Data - PCM - Packet 3 - Device 0 | A→B | Xair_MvTxRxInd |
| 0x30 | Voice Data - PCM - Packet 4 - Device 0 | B→A | Xair_MvTxRxInd |
| 0x31 | Voice Data - PCM - Packet 4 - Device 0 | A→B | Xair_MvTxRxInd |
| 0x32 | Voice Data - PCM - Packet 5 - Device 0 | B→A | Xair_MvTxRxInd |

Cross reference between SPI commands and primitives

| Command | Description | Direction | Primitive |
|---|---|---|---|
| 0x33 | Voice Data - PCM - Packet 5 - Device 0 | A→B | Xair_MvTxRxInd |
| 0x34 | Voice Data - PCM - Packet 6 - Device 0 | B→A | Xair_MvTxRxInd |
| 0x35 | Voice Data - PCM - Packet 6 - Device 0 | A→B | Xair_MvTxRxInd |
| 0x36 | Voice Data - PCM - Packet 7 - Device 0 | B→A | Xair_MvTxRxInd |
| 0x37 | Voice Data - PCM - Packet 7 - Device 0 | A→B | Xair_MvTxRxInd |
| 0x3E | Set Voice Coding Type | B→A | Xair_MvSampleRateInd |
| 0x3F | Voice Coding Type Response | A→B | Xair_MvSampleRateInd |
| 0x42 | Link Status Request | B→A | Xair_MdConnectConf |
|  |  |  | Xair_MdDisconnectConf |
|  |  |  | Xair_MvConnectConf |
|  |  |  | Xair_MvDisconnectConf |
|  |  |  | Xair_MmBindConf |
| 0x43 | Link Status | A→B | Xair_MdConnectConf |
|  |  |  | Xair_MdDisconnectConf |
|  |  |  | Xair_MdDisconnectInd |
|  |  |  | Xair_MvConnectConf |
|  |  |  | Xair_MvDisconnectConf |
|  |  |  | Xair_MvDisconnectInd |
|  |  |  | Xair_MmBindConf |
| 0x44 | EEPROM Read Request | B→A | Xair_MmReadReq |
| 0x45 | EEPROM Read Response | A→B | Xair_MmReadConf |
| 0x46 | EEPROM Write Request | B→A | Xair_MmWriteReq |
| 0x47 | EEPROM Write Response | A→B | Xair_MmWriteConf |
| 0x80 | Startup Configuration Message | B→A | Xair_MmStartReq |
| 0x81 | Startup Configuration Response | A→B | Xair_MmStartConf |
| 0x82 | smart transceiver Startup Message Request | B→A | Xair_MmStartReq |
| 0x83 | smart transceiver Startup Message | A→B | Xair_MmStartConf |
|  |  |  | Xair_MmResetInd |
| 0x84 | Application Configuration Request | B→A | Xair_MmStartReq |
| 0x85 | Application Configuration Response | A→B | Xair_MmStartConf |
| 0xB8 | Wireless Frame Sync Setup | B→A | Option: Xair_MvTxRxInd |
| 0xB9 | Wireless Frame Sync Setup Response | A→B | Option: Xair_MvTxRxInd |
| 0xBB | Wireless Frame Sync | A→B | Option: Xair_MvTxRxInd |
| 0xC0 | GPIO Setup Message | B→A | Xair_MmStartReq |
| 0xC1 | GPIO Setup Response | A→B | Xair_MmStartConf |
| 0xC2 | GPIO Read/Write Message | B→A | Xair_MgIoReq |
| 0xC3 | GPIO status/response Message | A→B | Xair_MgIoConf |
|  |  |  | Xair_MgIoInd |
| 0xE0 | Data Connection Request | B→A | Xair_MdConnectReq |
|  |  |  | Xair_MdDisconnectReq |
|  |  |  | Xair_MmBindReq |
| 0xE1 | Data Connection Response | A→B | Xair_MdConnectConf |
|  |  |  | Xair_MdDisconnectConf |
|  |  |  | Xair_MmBindConf |
| 0xE2 | Voice Connection Request | B→A | Xair_MvConnectReq |
|  |  |  | Xair_MvDisconnectReq |
| 0xE3 | Voice Connection Response | A→B | Xair_MvConnectConf |
|  |  |  | Xair_MvDisconnectConf |
| 0xFF | SPI Mode Detect | A→B | Xair_MmStartReq |
|  |  |  | Xair_MmStartConf |
|  |  |  | Xair_MmStartInd |
| — | — | — | Xair_MdPurgeReq |

Appendix B provides details of various functions provided by the API services.

Lastly, while the present disclosure has been described in connection with the preferred aspects, as illustrated in the various figures, it is understood that other similar aspects may be used or modifications and additions may be made to the described aspects for performing the same function of the present disclosure without deviating there from. For example, in various aspects of the disclosure, a protocol and API were disclosed. However, other equivalent mechanisms to these described aspects are also contemplated by the teachings herein. Therefore, the present disclosure should not be limited to any single aspect, but rather construed in breadth and scope in accordance with the appended claims.

APPENDIX A

Smart Transceiver Startup Message

When the smart transceiver first starts up and the SPI mode has been detected and it is ready for SPI transfer it may load a startup message in its SPI output FIFO and assert the "D_AVAIL#" line. This message is typically used as a configuration message to let the master control application know the type of chip and its configuration. Even though the smart transceiver may automatically send this message at startup, the master control application may request it at any time with the smart transceiver Startup Message Request.

Smart Transceiver to Master Control Application

TABLE 1

Smart transceiver Startup Message (0x83)

| Offset | Field | Size |
| --- | --- | --- |
| 0 | 0x83 | 1 |
| 1 | Len = 10 | 1 |
| 2 | SPI Protocol Version | 2 |
| 4 | Chip Hardware Version | 2 |
| 6 | Firmware Version | 2 |
| 8 | Abilities | 1 |
| 9 | Startup GPIO | 2 |
| 10 | Startup Event | 1 |

Master Control Application to Smart Transceiver

TABLE 2

Smart transceiver Startup Message Request (0x82)

| Offset | Field | Size |
| --- | --- | --- |
| 0 | 0x82 | 1 |
| 1 | 0 | 1 |

Startup Configuration

After the master control application has received the Smart transceiver startup message it may send a startup configuration message to the Smart transceiver Chip. This message may let the Smart transceiver know what SPI protocol version it is using and the output clock speed it wants. The response message may contain the configuration data that was sent for a debugging check. The current startup configuration may be polled by the master control application sending the command with a length of 0 (no payload).

Master Control Application to Smart Transceiver

TABLE 3

Smart transceiver Startup Configuration Message (0x80)

| Offset | Field | Size |
| --- | --- | --- |
| 0 | 0x80 | 1 |
| 1 | Len | 1 |
| 2 | EEPROM Type | 1 |
| 3 | EEPROM Length | 2 |
| 5 | SPI Protocol Version | 2 |
| 7 | Smart transceiver Output Clock Select | 1 |

Smart Transceiver to Master Control Application

Note that the response contains the data sent with the startup command as a confirmation it was received correctly.

TABLE 4

Startup Configuration Response (0x81)

| Offset | Field | Size |
| --- | --- | --- |
| 0 | 0x81 | 1 |
| 1 | Len = 0x7 | 1 |
| 2 | Status | 1 |
| 3 | EEPROM Type | 1 |
| 4 | EEPROM Length | 2 |
| 6 | SPI Protocol Version | 2 |
| 8 | Smart transceiver Output Clock Select | 1 |

If the SPI driver uses an SPI protocol version which is different than which the chip supports, the chip may return its supported version and not the requested version. It is the driver's responsibility to use a version the chip can operate with.

Mode Control

The master control application has ultimate control over the smart transceiver operation. The mode commands allow the master control application to change the smart transceiver between modes. The different reset modes reset the smart transceiver chip so that it can start from a known state. The power modes either power down the smart transceiver or put it into another power state. A mode change message may be acknowledged by the smart transceiver before the mode change occurs.

The mode control poll is a good choice to use for a "keep alive" message for the master control application to determine the smart transceiver is still running correctly in different modes.

Master Control Application to Smart Transceiver

The master control application may send this command to the smart transceiver to change the mode or request the current mode. If no length is sent the request may be considered a poll of the current mode.

TABLE 5

Mode Control Request (0x02)

| Offset | Field | Size |
| --- | --- | --- |
| 0 | 0x02 | 1 |
| 1 | Len | 1 |
| 2 | Mode | 1 |

Smart Transceiver to Master Control Application

TABLE 6

Mode Control Response (0x03)

| Offset | Field | Size |
| --- | --- | --- |
| 0 | 0x03 | 1 |
| 1 | Len = 1 | 1 |
| 2 | Mode Accepted or Current state | 1 |

The Mode Control Response Message may be available at the SPI interface within 1 msec of reception of the Mode Control Request.

Message Buffer Warnings

Typically, the master control application may not send messages too fast for the smart transceiver to handle. Error messages are defined, however, in case the smart transceiver buffers are starting to fill. There is one message for warning the master control application about the buffers that are almost full. There is another message to clear the warning for a buffer type. In addition, there is a message for the smart transceiver to tell the master control application that the last message was rejected. The reject message would only be sent if the master control application ignores the buffer warning and sends data for that buffer anyway or if the message is wrong for the current application or state.

Smart Transceiver to Master Control Application Buffer Warning

This message may be sent by the smart transceiver when a buffer or buffers are almost filled. The smart transceiver firmware may be written such that it may send the warning when there is still room for at least one more message (not including the one currently being received). Anytime this message is sent a complete list of all buffers that are in a warning status may be sent. When the master control application receives a buffer warning, it should no longer send a buffer of that type until the warning is cleared.

TABLE 7

Buffer Warning Message (0x05)

| Offset | Field | Size |
|---|---|---|
| 0 | 0x05 | 1 |
| 1 | Len | 1 |
| 2 | List of buffer types | Variable |

Smart Transceiver to Master Control Application Buffer Warning Cleared

This message may be sent when a buffer in warning has sufficiently cleared to allow more messages. The payload may list each of the buffer types that are being cleared. This may only list the buffers that had the warning type set previously and which are now safe to write to.

TABLE 8

Buffer Warning Cleared Message (0x07)

| Offset | Field | Size |
|---|---|---|
| 0 | 0x07 | 1 |
| 1 | Len | 1 |
| 2 | List of buffer types | Variable |

Smart Transceiver to Master Control Application Message Fail

With good master control application coding, this message should never be sent but it may be if the master control application ignores a buffer warning message and sends a buffer that cannot be accepted by the smart transceiver or if the message is wrong for the current application or state.

TABLE 9

Message Fail (0x01)

| Offset | Field | Size |
|---|---|---|
| 0 | 0x01 | 1 |
| 1 | Len = 1 | 1 |
| 2 | Message type | 1 |

EEPROM Commands

The master control application may request data to be written to or read from the EEPROM. Messages are limited to 32 bytes of data and only one message can be outstanding at a time (one EEPROM read or one write message).

EEPROM Read

The master control application can request data from the EEPROM. This is performed with a read request. Sometime later, when the smart transceiver chip as read the EEPROM, it may return the data over the SPI with the EEPROM read response message. Both messages contain the EEPROM offset and length being read, this lets the master control application sync its outstanding read request with the response. If there is an error, the smart transceiver may return a request with no EEPROM data read. The messaging allows the master control application processor to put a context in the message to be returned. This can be used in any way the master control application processor wants. For example, this may be a task number to resume when the response message is received.

Master Control Application to Smart Transceiver EEPROM Read Request

TABLE 10

EEPROM Read Request (0x44)

| Offset | Field | Size |
|---|---|---|
| 0 | 0x44 | 1 |
| 1 | Len = 0x5 | 1 |
| 2 | Offset | 2 |
| 4 | EEPROM data Length | 1 |
| 5 | Master control application Context | 2 |

Smart Transceiver to Master Control Application EEPROM Read Response

TABLE 11

EEPROM Read Response (0x45)

| Offset | Field | Size |
|---|---|---|
| 0 | 0x45 | 1 |
| 1 | Len = 0x5 + EEPROM data Length | 1 |
| 2 | Offset | 2 |
| 4 | EEPROM data Length | 1 |
| 5 | Master control application Context | 2 |
| 7 | Data | EEPROM data length |

EEPROM Write

The master control application can save nonvolatile data in the EEPROM. This is performed with a write request. Sometime later, after the smart transceiver chip has written the data and validated it, it may return a response message over the SPI channel to let the master control application know it is done. Both messages may contain the EEPROM offset and length being read, allowing the master control application to sync its outstanding write request with the response. If there is an error, the smart transceiver may return a request with an error status. The messaging allows the master control application processor to put a context in the message to be returned. This can be used any way the master control application processor wants. For example, this may be a task number to resume when the response message is received. Data written may be returned in the response so the master control application can verify the correct data was written.

Master Control Application to Smart Transceiver EEPROM Write Request

TABLE 12

EEPROM Write Request (0x46)

| Offset | Field | Size |
|---|---|---|
| 0 | 0x46 | 1 |
| 1 | Len = 0x5 + Data to be written | 1 |
| 2 | Offset | 2 |
| 4 | EEPROM data Length | 1 |
| 5 | Master control application Context | 2 |
| 7 | Data | EEPROM data Length |

Smart Transceiver to Master Control Application EEPROM Write Response

TABLE 13

| | EEPROM Write Response (0x47) | |
|---|---|---|
| Offset | Field | Size |
| 0 | 0x47 | 1 |
| 1 | Len = 0x6 + Len of data repeated | 1 |
| 2 | Offset | 2 |
| 4 | EEPROM data Length | 1 |
| 5 | Master control application Context | 2 |
| 7 | Status | 1 |
| 8 | Data written | EEPROM data length |

There two parts of the smart transceiver firmware that may be to know the current voice type.
1. The link layer may need to know what type of data is being sent upstream.
2. If the smart transceiver hardware is providing voice encoding/decoding the application may be to know the coding type to use for encoding.

When this comment is transmitted, the smart transceiver may change the HW encode type for the upstream path, if necessary, and also tag the upstream voice data with this type. If the command is sent without a payload, the Smart transceiver may send the current type.

Master Control Application to Smart Transceiver Set Voice Encoding Type

TABLE 14

| | Set Voice Encoding Type (0x3E) | |
|---|---|---|
| Offset | Field | Size |
| 0 | 0x3E | 1 |
| 1 | Len | 1 |
| 2 | Upstream Encode type | |

Smart Transceiver to Master Control Application Voice Encoding Type Response

TABLE 15

| | Voice Encoding Type Response (0x3F) | |
|---|---|---|
| Offset | Field | Size |
| 0 | 0x3F | 1 |
| 1 | Len + 1 | 1 |
| 2 | Upstream Encode type | |

GPIO Control

The smart transceiver IC has spare GPIO pins that can be used by the master control application chip for either inputs or outputs. At the smart transceiver initialization time all of the spare GPIOs may be configured as inputs and their status may be sent as part of the smart transceiver Startup message. Messages may allow the master control application to configure the GPIOs and to read or write to the GPIOs. When configuring inputs, the master control application can request that GPIO status messages be sent whenever a requested input changes. These messages may be queued and ready to send to the master control application within 4 msec. The GPIO status messages are lower priority than buffer and mode messages.

In all GPIO commands, bit 0 maps to GPIO 0, bit 1 maps to GPIO 1, etc.

Master Control Application to Smart Transceiver GPIO Setup

If the master control application wants to use the GPIO of the smart transceiver it has to set them up correctly. There are separate bit maps to determine inputs and outputs.

TABLE 16

| | GPIO SETUP (0xC0) | |
|---|---|---|
| Offset | Field | Size |
| 0 | 0xC0 | 1 |
| 1 | Len | 1 |
| 2 | Inputs | 2 |
| 4 | Outputs | 2 |
| 6 | Output Type | 2 |
| 8 | Initial Output state | 2 |
| 10 | Interrupt Mask | 2 |
| 12 | Input termination | 4 |

Smart Transceiver to Master Control Application GPIO Setup Response

TABLE 17

| | GPIO SETUP RESPONSE (0xC1) | |
|---|---|---|
| Offset | Field | Size |
| 0 | 0xC1 | 1 |
| 1 | Len = 8 | 1 |
| 2 | Inputs | 2 |
| 4 | Outputs | 2 |
| 6 | Output Type | 2 |
| 8 | Initial Output state | 2 |
| 10 | Interrupt Mask | 2 |
| 12 | Input termination | 4 |

Master Control Application to Smart Transceiver GPIO Read/Write

TABLE 18

| | GPIO SETUP (0xC2) | |
|---|---|---|
| Offset | Field | Size |
| 0 | 0xC2 | 1 |
| 1 | Len | 1 |
| 2 | Clear Mask | 2 |
| 4 | Set Mask | 2 |

Smart Transceiver to Master Control Application GPIO Status/Response

TABLE 19

| | GPIO SETUP RESPONSE (0xC3) | |
|---|---|---|
| Offset | Field | Size |
| 0 | 0xC3 | 1 |
| 1 | Len = 2 | 1 |
| 2 | Status | 2 |

Wireless Frame Sync

The application may set up the frame sync message to be any location in the frame. By default the frame sync message may be turned off. When enabled the frame sync message may be loaded into the SPI buffer and made ready when the frame bit clock reaches the trigger value.

Master Control Application to Smart Transceiver Frame Sync Setup Request

TABLE 20

Frame Sync Setup Request (0xB8)

| Offset | Field | Size |
|---|---|---|
| 0 | 0xB8 | 1 |
| 1 | Len | 1 |
| 2 | Location enumeration | 1 |

Smart Transceiver to Master Control Application Frame Sync Setup Response

TABLE 21

Frame Sync Setup Response (0xB9)

| Offset | Field | Size |
|---|---|---|
| 0 | 0xB9 | 1 |
| 1 | Len = 1 | 1 |
| 2 | Location enumeration | 1 |

Smart Transceiver to Master Control Application Frame Sync Message

TABLE 22

Frame Sync Message (0xBB)

| Offset | Field | Size |
|---|---|---|
| 0 | 0xBB | 1 |
| 1 | Len = 2 | 1 |
| 2 | Frame number | 2 |

Wireless Voice Sync

To improve throughput across the SPI port, it is possible to synchronize the upstream and downstream voice data so both packets types are transferred simultaneously across the full-duplex connection.

The Voice Sync Setup Request message can be used to enable the feature.

Master Control Application to Smart Transceiver Voice Sync Setup Request

By default, when this message is enabled, the Frame Sync message may be disabled. When this message is disabled, the Frame Sync message may be enabled.

TABLE 23

Voice Sync Setup Request (0x38)

| Offset | Field | Size |
|---|---|---|
| 0 | 0x38 | 1 |
| 1 | Len | 1 |
| 2 | Location enumeration | 1 |

Smart Transceiver to Master Control Application Voice Sync Setup Response

TABLE 24

Voice Sync Setup Response (0x39)

| Offset | Field | Size |
|---|---|---|
| 0 | 0x39 | 1 |
| 1 | Len | 1 |
| 2 | Location enumeration | 1 |

Smart Transceiver to Master Control Application Voice Sync Message

The master control application can use this message to begin full-duplex transport across the SPI interface.

TABLE 25

Voice Sync Message (0x3B)

| Offset | Field | Size |
|---|---|---|
| 0 | 0x3B | 1 |
| 1 | Len = 2 | 1 |
| 1 | CRC Status | 1 |
| 1 | Number of Packets | 1 |

Configuration Messaging

The configuration messages allow the master control application to set the smart transceiver chip to the correct application with its specific options.

Set Application and Options

This mechanism allows the master control application to select the correct application and the various options for it.

Master Control Application to Smart Transceiver Application Configuration—Third Party

TABLE 26

Application Configuration, third party (0x84)

| Offset | Field | Size |
|---|---|---|
| 0 | 0x84 | 1 |
| 1 | Len = Config Length | 1 |
| 2 | Gamepad Application = 1 | 1 |
| 3 | Option Flags | 2 |
| 5 | Upstream Voice Packet Size | 1 |
| 6 | Downstream Voice Packet Size | 1 |

Smart Transceiver to Master Control Application Application Configuration Response

TABLE 27

SPI Application Configuration Response (0x85)

| Offset | Field | Size |
|---|---|---|
| 0 | 0x85 | |
| 1 | Len | 1 |
| 2 | Config status | 1 |
| 3 | Gamepad Application = 1 | 1 |
| 4 | Option Flags 1 | 2 |
| 6 | Upstream Voice Packet Size | 1 |
| 7 | Downstream Voice Packet Size | 1 |

If invalid option flags or voice packet size fields are detected by the smart transceiver, it may remain in the Pre-Application state until it receives a valid Application Configuration command.

Host Connections

Once the master control application is ready it may try to initiate a connection to the host. In the gamepad application it may first establish the data connection and once that is done it may try to establish a voice connection if there is a headset plugged in. Once connections are established they can be dropped because of three different instances:

1. The master control application requests a link drop. In this case the link may be dropped and the radio turned off. The master control application may issue a new connection request to turn on the radio and reestablish a new link.
2. The host requests a link drop. In this case the link may be dropped and radio may be turned off. The master control application may be notified of the connection drop and the radio is off. The master control application may to issue a new connection request to turn on the radio and reestablish a new link.
3. Sync with host is lost. In this case the link may be dropped and radio may be turned off. The master control application may be notified of the connection drop and the radio is off. The master control application may have to issue a new connection request to turn on the radio and reestablish a new link.

Data Connection Request

Once the application is up and running it may ask the smart transceiver to connect to the host. The smart transceiver chip may use the protocol rules to find the host and select a wireless slot. As soon as the connection process is started, the host may return a connect request response. Once a slot is obtained a connection status report may be sent. If the master control application wants the connection dropped, it may set the Action to "Drop Connection" and send that message. The Smart transceiver may drop the connection and turn off the radio. A "connection dropped" response may be returned. In addition, a link status message may be sent with a link status of "Slot dropped per master control application request", and then a link status of "Radio off".

The master control application shouldn't send any data to be transferred before it receives a link status message indicating the link was acquired. If it does, the data may get flushed and never sent.

Master Control Application to Smart Transceiver Data Connection Request

Note that this command may include a field for initial reports.

TABLE 28

| Data Connection Request (0xE0) | | |
| --- | --- | --- |
| Offset | Field | Size |
| 0 | 0xE0 | 1 |
| 1 | Len | 1 |
| 2 | Action | 1 |
| 3 | Initial Reports | Reports Len |

Smart Transceiver to Master Control Application Data Connection Response

TABLE 29

| Data Connection Response (0xE1) | | |
| --- | --- | --- |
| Offset | Field | Size |
| 0 | 0xE1 | 1 |
| 1 | Len = 1 | 1 |
| 2 | Status | 1 |

Voice Connection Request

Once the application is up and running and a headset is plugged in and a data connection is obtained, the master control application may ask the smart transceiver for a voice connection. The smart transceiver chip may use the gamepad voice protocol rules to select a wireless slot. As soon as the connection process is started, the host may return a connect request response. Once a slot is obtained a connection status report may be sent.

Master Control Application to Smart Transceiver Voice Connection Request

TABLE 30

| Voice Connection Request (0xE2) | | |
| --- | --- | --- |
| Offset | Field | Size |
| 0 | 0xE2 | 1 |
| 1 | Len = 1 | 1 |
| 2 | Action | 1 |
| 3 | Initial Reports | Reports Len |

Smart Transceiver to Master Control Application Voice Connection Response

TABLE 31

| Voice Connection Response (0xE3) | | |
| --- | --- | --- |
| Offset | Field | Size |
| 0 | 0xE3 | 1 |
| 1 | Len = 1 | 1 |
| 2 | Status | 1 |

Link Status

The master control application may want to query link status. In addition, the smart transceiver application may want to send messages when the link status changes.

Voice Slot Availability

Master Control Application to Smart Transceiver Link Status Request

TABLE 32

| Link Status Request (0x42) | | |
| --- | --- | --- |
| Offset | Field | Size |
| 0 | 0x42 | 1 |
| 1 | Len = 0 | 1 |

Smart Transceiver to Master Control Application Link Status

TABLE 33

| | Link Status Response (0x43) | |
| --- | --- | --- |
| Offset | Field | Size |
| 0 | 0x43 | 1 |
| 1 | Len = 2 | 1 |
| 2 | Device Status | 1 |
| 3 | Voice Status | 1 |

Controller Buffer Transfers

Once the applications are up and running and the radio links are obtained, most of the transfers are buffer transfers for data to be sent or data that was received. Each data type defined in the protocol has its own set of buffers. For upstream messages, the master control application may send buffers as it has them. If the buffer allocation for a particular data type is low the Smart transceiver chip may send a warning with the buffer type that is low. The master control application can only send one more buffer of that type (including one that may be simultaneously being transferred) until it gets a "warning clear". In practice, it is assumed that there are enough buffers that the warnings may never happen. As the smart transceiver receives messages from the wireless channel, it may send them on to the master control application using the correct data type message.

Master Control Application to Smart Transceiver (Upstream) Buffers

Controller Header Report

Controller header reports are the status reports sent via the wireless header. An example of these is the device type report.

TABLE 34

| | Controller Header Report (0x08) | |
| --- | --- | --- |
| Offset | Field | Size |
| 0 | 0x08 | 1 |
| 1 | Len | 1 |
| 2 | Header buffer | 2 |

Controller Data

TABLE 35

| | Controller Data (0x0C) | |
| --- | --- | --- |
| Offset | Field | Size |
| 0 | 0x0C | 1 |
| 1 | Len = 19 | 1 |
| 2 | Controller buffer | 19 |

Controller Transport

| Offset | Field | Size |
| --- | --- | --- |
| 0 | 0x12 | 1 |
| 1 | Len | 1 |
| 2 | Controller transport buffer | 24 |

Generic Report Buffer

This buffer type may be for all buffer types that do not have a dedicated buffer message

TABLE 36

| | Generic Report Buffer (0x0A) | |
| --- | --- | --- |
| Offset | Field | Size |
| 0 | 0x0A | 1 |
| 1 | Len | 1 |
| 2 | Packet Type | 1 |
| 3 | Buffer data | Variable |

Smart Transceiver to Master Control Application (Downstream) Buffers

Controller Header Request

TABLE 37

| | Controller Header Request (0x09) | |
| --- | --- | --- |
| Offset | Field | Size |
| 0 | 0x09 | 1 |
| 1 | Len | 1 |
| 2 | Header buffer | 2 |

Controller Data

TABLE 38

| | Controller Data Buffer (0x0D) | |
| --- | --- | --- |
| Offset | Field | Size |
| 0 | 0x0D | 1 |
| 1 | Len | 1 |
| 2 | Controller Data buffer | 8 |

Controller Transport

TABLE 39

| | Controller Transport (0x13) | |
| --- | --- | --- |
| Offset | Field | Size |
| 0 | 0x13 | 1 |
| 1 | Len | 1 |
| 2 | Controller transport buffer | 8 |

Generic Request Buffer

This buffer type may handle all of the reserved or unsupported wireless packet types.

TABLE 40

| | Generic Request Buffer (0x0B) | |
| --- | --- | --- |
| Offset | Field | Size |
| 0 | 0x0B | |
| 1 | Len | 1 |
| 2 | Packet type | 1 |
| 2 | Buffer data | 8 |

Voice Buffer Transfers

The voice buffers may be the longest data that can be sent in one message on a regular basis. To allow better use of the full-duplex bus, the master control application may configure the voice buffers to be split into smaller pieces. This configuration may be set at startup and not set on the fly. Packet 0 may considered the base type and if the voice is not split up it may be the only voice packet type transferred. The master control application processor may let the smart transceiver chip know which type of coding is being used so that it can put the correct data type in the voice header. If the smart transceiver is performing the voice encoding it may use the type that the master control application has set. The smart transceiver may need to keep track of the voice packets received over SPI and ensure that, when split packets are used, all packets are received before the complete buffer is sent over the wireless channel. The master control application may need to provide similar functionality on the data it receives from the smart transceiver.

Master Control Application to Smart Transceiver (Upstream) Buffers

Voice Header Report

TABLE 41

Voice Header Report (0x14)

| Offset | Field | Size |
|---|---|---|
| 0 | 0x14 | 1 |
| 1 | Len | 1 |
| 2 | Header buffer | 2 |

Voice Transport

TABLE 42

Voice Transport Report (0x16)

| Offset | Field | Size |
|---|---|---|
| 0 | 0x16 | 1 |
| 1 | Len | 1 |
| 2 | Voice Transport buffer | 24 |

PCM Voice Packets 0-7

If the master control application has configured the application to provide voice decode and encode, these packet types may be used to fill the buffer. The configuration option "Upstream Voice Packet Count" may be used to control which packets are sent. Packets with different command codes may be used so that the smart transceiver can set up its DMA to point to the correct buffer location. Table 43 shows the maximum packet sizes used for PCM packets.

All PCM samples may be 16-bit, 2's compliment, little-endian format. This means the first byte is the low byte of the first sample, the second byte is the high byte of the first sample, etc. In addition, if an ADC is used that is less than 16 bits, the samples may be left justified.

TABLE 43

Upstream PCM Voice Packet Size vs. Number of packets

| Packet Count | Max Packet Size (bytes) | Packets Sent |
|---|---|---|
| 4 | 64 | Packet 0-Packet 3 |
| 8 | 32 | Packet 0-Packet 7 |

TABLE 44

PCM Voice Buffer (0x28-0x36)

| Offset | Field | Size |
|---|---|---|
| 0 | 0x28 for packet 0<br>0x2A for packet 1<br>0x2C for packet 2 | 1 |

TABLE 44-continued

PCM Voice Buffer (0x28-0x36)

| Offset | Field | Size |
|---|---|---|
|   | 0x2E for packet 3<br>0x30 for packet 4<br>0x32 for packet 5<br>0x34 for packet 6<br>0x36 for packet 7 |   |
| 1 | Len | 1 |
| 2 | Voice buffer | See Table 43 for sizes |

Smart Transceiver to Master Control Application (Downstream) Buffers

Voice Header Request

TABLE 45

Voice Header Request (0x15)

| Offset | Field | Size |
|---|---|---|
| 0 | 0x15 | 1 |
| 1 | Len | 1 |
| 2 | Header buffer | 2 |

Voice Transport

TABLE 46

Voice Transport Report (0x17)

| Offset | Field | Size |
|---|---|---|
| 0 | 0x17 | 1 |
| 1 | Len | 1 |
| 2 | Voice Transport buffer | 8 |

PCM Voice Packets 0-7

If the master control application has configured the application to provide voice decode and encode, these packet types may be sent. The configuration option "Downstream Voice Packet Count" may be used to control how many packets are sent. Table 47 shows the maximum packet sizes used for PCM packets. Note that the packets may contain an extra byte for status to let the master control application processor know whether the data CRC validated. "Bad" data may only be sent if the master control application has configured the smart transceiver for it.

TABLE 47

Downstream PCM Voice Packet Size vs.. Number of packets

| Packet Count | Max Packet Size (bytes) | Packets Sent |
|---|---|---|
| 2 | 64 | Packet 0, Packet 1 |
| 4 | 32 | Packet 0-Packet 3 |

TABLE 48

PCM Voice Buffer Packets 0-7 (0x29-0x37)

| Offset | Field | Size |
|---|---|---|
| 0 | 0x29 for packet 0<br>0x2B for packet 1<br>0x2D for packet 2 | 1 |

TABLE 48-continued

| | PCM Voice Buffer Packets 0-7 (0x29-0x37) | |
|---|---|---|
| Offset | Field | Size |
| | 0x2F for packet 3 | |
| | 0x31 for packet 4 | |
| | 0x33 for packet 5 | |
| | 0x35 for packet 6 | |
| | 0x37 for packet 7 | |
| 1 | Len | 1 |
| 2 | Status | 1 |
| 3 | Voice buffer | See Table 47 for sizes |

Configuration Messaging

The configuration messages allow the master control application to set the smart transceiver chip to the correct application with its specific options.

Set Application and Options

This mechanism allows the master control application to select the correct application and the various options for it.

Master Control Application to Smart Transceiver Application Configuration—Third Party

TABLE 49

| | Application Configuration, third party (0x84) | |
|---|---|---|
| Offset | Field | Size |
| 0 | 0x84 | 1 |
| 1 | Len = Config Length | 1 |
| 2 | Voice Application = 2 | 1 |
| 3 | Option Flags 1 | 2 |
| 5 | Upstream Voice Packet Size | 1 |
| 6 | Downstream Voice Packet Size | 1 |

Smart Transceiver to Master Control Application Application Configuration Response

TABLE 50

| | Application Configuration Response (0x85) | |
|---|---|---|
| Offset | Field | Size |
| 0 | 0x85 | 1 |
| 1 | Len | 1 |
| 2 | Config status | 1 |
| 3 | Voice Application = 2 | 1 |
| 4 | Option Flags 1 | 2 |
| 6 | Upstream Voice Packet Size | 1 |
| 7 | Downstream Voice Packet Size | 1 |

Host Connection

Once the master control application is ready it may try to initiate a connection to the host. In the voice device application it may first search for and sync with the host and then may establish a voice slot connection using the voice device protocol. Once connections are established they can be dropped because of three different instances:

1. The master control application requests a link drop or radio off. In this case the link may be dropped. If the master control application requested the radio off and the sync with the host may also be dropped and the radio may be turned off. In either case, the master control application may have to issue a new connection request to reestablish a new link.

2. The host requests a link drop. In this case the link may be dropped and the master control application may be notified but the sync with the host may be maintained. This allows a connection to be performed in the future without having to search for the host. In this scenario the smart transceiver may try and reestablish a connection and inform the master control application if it does.

3. Sync with host is lost. In this case the smart transceiver application may try to resync with the host and then reestablish lost connections. The master control application may be informed of the progress but doesn't have to resend connect messages.

Voice Connection Request

Once the application is up and running the master control application may ask the smart transceiver for a voice connection. The smart transceiver chip may use the voice device protocol rules to select a wireless slot. As soon as the connection process is started, the host may return a connect request response. Once a slot is obtained a connection status report may be sent. If there is no binding information the smart transceiver may return an error connection response.

Master Control Application to Smart Transceiver Voice Connection Request

TABLE 51

| | Voice Connection Request (0xE2) | |
|---|---|---|
| Offset | Field | Size |
| 0 | 0xE2 | 1 |
| 1 | Len = 1 | 1 |
| 2 | Action | 1 |
| 3 | Initial Reports | Reports Len |

Smart Transceiver to Master Control Application Voice Connection Response

TABLE 52

| | Voice Connection Response (0xE3) | |
|---|---|---|
| Offset | Field | Size |
| 0 | 0xE3 | 1 |
| 1 | Len = 1 | 1 |
| 2 | Status | 1 |

Link Status

The master control application may want to query link status. In addition, the smart transceiver application may want to send messages when the link status changes.

Voice Slot Availability

Master Control Application to Smart Transceiver Link Status Request

TABLE 53

| | Link Status Request (0x42) | |
|---|---|---|
| Offset | Field | Size |
| 0 | 0x42 | 1 |
| 1 | Len = 0 | 1 |

Smart Transceiver to Master Control Application Link Status

TABLE 54

| | Link Status Response (0x43) | |
|---|---|---|
| Offset | Field | Size |
| 0 | 0x43 | 1 |
| 1 | Len = 2 | 1 |
| 2 | Device Status | 1 |
| 3 | Voice Status | 1 |

Voice Buffer Transfers

The voice buffers are the longest data that can be sent in one message on a regular basis. To allow better use of the full-duplex bus, the master control application may configure the voice buffers to be split into smaller pieces. This configuration may be set at startup and not on the fly. Packet 0 is considered the base type and if the voice is not split up it may be the only voice packet type transferred. The master control application processor may let the smart transceiver chip know which type of coding is being used so that it can put the correct data type in the voice header. If the smart transceiver is performing the voice encoding it may use the type that the master control application has set. The smart transceiver may need to keep track of the voice packets received over SPI and ensure that, when split packets are used, all packets are received before the complete buffer is sent over the wireless channel. The master control application may need to provide similar functionality on the data it receives from the smart transceiver.

Master Control Application to Smart Transceiver (Upstream) Buffers
Voice Header Report

TABLE 55

| | Voice Header Report (0x14) | |
|---|---|---|
| Offset | Field | Size |
| 0 | 0x14 | 1 |
| 1 | Len | 1 |
| 2 | Header buffer | 2 |

Voice Transport

Voice transport is used in voice devices for command request and status reporting.

TABLE 56

| | Voice Transport Report (0x16) | |
|---|---|---|
| Offset | Field | Size |
| 0 | 0x16 | 1 |
| 1 | Len | 1 |
| 2 | Voice Transport buffer | 24 |

PCM Voice Packets 0-7

If the master control application has configured the application to provide voice decode and encode, these packet types may be used to fill the buffer. The configuration option "Upstream Voice Packet Count" may be used to control which packets are sent. Packets with different command codes may be used so that the smart transceiver can set up its DMA to point to the correct buffer location. Table 43 shows the maximum packet sizes used for PCM packets.

All PCM samples are 16-bit, 2's compliment, little-endian format. This means the first byte is the low byte of the first sample, the second byte is the high byte of the first sample, etc. In addition, if an ADC is used that is less than 16 bits, the samples may be left justified.

TABLE 57

| Upstream PCM Voice Packet Size vs. Number of packets | | |
|---|---|---|
| Packet Count | Max Packet Size (bytes) | Packets Sent |
| 4 | 64 | Packet 0-Packet 3 |
| 8 | 32 | Packet 0-Packet 7 |

TABLE 58

| | PCM Voice Buffer (0x28-0x36) | |
|---|---|---|
| Offset | Field | Size |
| 0 | 0x28 for packet 0<br>0x2A for packet 1<br>0x2C for packet 2<br>0x2E for packet 3<br>0x30 for packet 4<br>0x32 for packet 5<br>0x34 for packet 6<br>0x36 for packet 7 | 1 |
| 1 | Len | 1 |
| 2 | Voice buffer | See Table 57 for sizes |

Smart Transceiver to Master Control Application (Downstream) Buffers
Voice Header Request

TABLE 59

| | Voice Header Request (0x15) | |
|---|---|---|
| Offset | Field | Size |
| 0 | 0x15 | 1 |
| 1 | Len | 1 |
| 2 | Header buffer | 2 |

Voice Transport

Voice transport may be used in voice devices for command request and status reporting.

TABLE 60

| | Voice Transport Report (0x17) | |
|---|---|---|
| Offset | Field | Size |
| 0 | 0x17 | 1 |
| 1 | Len | 1 |
| 2 | Voice Transport buffer | 8 |

PCM Voice Packets 0-7

If the master control application has configured the application to provide voice decode and encode, these packet types are sent. The configuration option "Downstream Voice Packet Count" is used to control how many packets are sent. Table 47 shows the maximum packet sizes used for PCM packets. Note that the packets contain an extra byte for status to let the master control application processor know whether the data CRC validated.

TABLE 61

| Downstream PCM Voice Packet Size vs.. Number of packets | | |
|---|---|---|
| Packet Count | Max Packet Size | Packets Sent |
| 2 | 64 | Packet 0, Packet 1 |
| 4 | 32 | Packet 0-Packet 3 |

TABLE 62

PCM Voice Buffer Packets 0-7 (0x29-0x37)

| Offset | Field | Size |
|---|---|---|
| 0 | 0x29 for packet 0<br>0x2B for packet 1<br>0x2D for packet 2<br>0x2F for packet 3<br>0x31 for packet 4<br>0x33 for packet 5<br>0x35 for packet 6<br>0x37 for packet 7 | 1 |
| 1 | Len | 1 |
| 2 | Status | 1 |
| 3 | Voice buffer | See Table 61 for sizes |

APPENDIX B

Request Functions for the Data Service

API request functions may be called from the application in order to initiate an action in the communication stack at the API level. API functions may be prefixed with and suffixed with _req.

Xair_MdDataReq

| | |
|---|---|
| Function | XAIR_RESULT_T Xair_MdDataReq<br>( XAIR_UP_PACKET_T PacketType,<br>uint8 * Data ); |
| Execution | Asynchronous. |
| Description | Sends an upstream data packet to the master device. The amount of local buffering is defined in the API configuration. The default buffer depth is 4, meaning data is copied once and up to four buffers are available. At least one buffer is needed because of asynchronous execution. |
| Input Parameter | Packet Type: The size of the data buffer is also determined by the packet type<br>Data: points to the data to transmit |
| Return Value | XAIR_SUCCESS: The contents of the data buffer was copied and is scheduled to be sent to the smart transceiver chip.<br>XAIR_BUFFER_FULL: The operation failed because there is no space available to queue the request (API flow control).<br>XAIR_OVERLOAD: The operation failed because currently this packet type is not accepted for transmission on the radio link (flow control by the smart transceiver). This may happen when the throughput of the radio link was exceeded.<br>XAIR_CLOSED: The operation failed because the data connection is closed. |

Xair_MdConnectReq

TABLE 63

Device Subtypes

| | |
|---|---|
| Function | XAIR_RESULT_T Xair_MdConnectReq ( uint8 * Data ); |
| Execution | Asynchronous |
| Description | Establishes a data connection to the master device. |
| Input Parameter | Data: points to the data to transmit |
| Return Value | XAIR_SUCCESS: A data connection request was initiated.<br>XAIR_BUFFER_FULL: The operation failed because there is no space available to queue the request (API flow control).<br>XAIR_NOT_AVAILABLE: The operation failed because the communication to the smart transceiver chip is not established and configured. |

Xair_MdDisconnectReq

| | |
|---|---|
| Function | XAIR_RESULT_T Xair_MdConnectReq ( void ); |
| Execution | Asynchronous |
| Description | Establishes a data connection to the master device. |
| Input Parameter | — |
| Return Value | XAIR_SUCCESS: A data connection release was initiated.<br>XAIR_BUFFER_FULL: The operation failed because there is no space available to queue the request (API flow control).<br>XAIR_NOT_AVAILABLE: The operation failed because the communication to the smart transceiver chip is not established and configured. |

Events for the Data Service

Xair_MdDataInd

| | |
|---|---|
| Event | XAIR_MD_DATA_IND |
| Description | Receives a downstream data packet from the master device. |
| Parameter 1 | XAIR_DOWN_PACKET T *: . |
| Parameter 2 | uint8 *: points to the data to be received. The size is determined by the packet type |

Xair_MdConnectConf

| | |
|---|---|
| Event | XAIR_MD_CONNECT_CONF |
| Description | Reply to the data connection request. |
| Parameter 1 | XAIR_RESULT *: points to the result of the connection request.<br>XAIR_SUCCESS: The data connection is established.<br>XAIR_ERROR: The operation failed. |

Xair_MdDisconnectConf

| | |
|---|---|
| Event | XAIR_MD_DISCONNECT_CONF |
| Description | Reply to the data connection release request. |
| Parameter 1 | XAIR_RESULT_T *: points to the result of the release request.<br>XAIR_SUCCESS:The data connection is now closed. |

Xair_MdDisconnectInd

| | |
|---|---|
| Event | XAIR_MD_DISCONNECT_IND |
| Description | Unsolicited indication of a data connection failure. |
| Parameter 1 | XAIR_RESULT_T *: points to the reason for the indication.<br>XAIR_CLOSED: The radio link was closed. |

Request Functions for the Xair Voice Service

Xair_MvConnectReq

| | |
|---|---|
| Function | XAIR_RESULT_T Xair_MvConnectReq ( uint8 * Data ); |
| Execution | Asynchronous. |
| Description | Establishes a voice connection to the master device. At first the smart transceiver audio codec will be switched to the default audio codec type, which is defined in <xair_api_xib.h>. Then the voice connection request is send to the smart transceiver chip. |
| Input Parameter | Data: points to the data to transmit |
| Return Value | XAIR_SUCCESS: A voice connection request was initiated.<br>XAIR_BUFFER_FULL: The operation failed because there is no space available to queue the request (API flow control).<br>XAIR_NOT_AVAILABLE: The operation failed because the communication to the smart transceiver chip is not established and configured. |

Xair_MvDisconnectReq

| | |
|---|---|
| Function | XAIR_RESULT_T Xair_MvDisconnectReq ( void ); |
| Execution | Asynchronous. |
| Description | .Releases an existing voice connection to the master device. |
| Input Parameter | — |
| Return Value | • XAIR_SUCCESS: A voice connection release was initiated.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Events for the Xair Voice Service
Xair_MvTxRxInd

| | |
|---|---|
| Event | XAIR_MV_RX_TX_IND |
| Description | This event is needed to ensure the synchronous processing of voice packet exchange relative to the wireless framing signal. The event occurs after all upstream/downstream voice packets of a wireless frame are exchanged via the SPI between the backend controller and the smart transceiver chip. Note: For audio clock synchronization the backend controller has to use the hardware frame sync signal. |

Xair_MvConnectConf

| | |
|---|---|
| Event | XAIR_MV_CONNECT_CONF |
| Description | Reply to the voice connection request. |
| Parameter 1 | XAIR_RESULT_T *: points to the result of the connection request.<br>• XAIR_SUCCESS: The voice connection is established.<br>• XAIR_ERROR: The operation failed. |

Xair_MvDisconnectConf

| | |
|---|---|
| Event | XAIR_MV_DISCONNECT_CONF |
| Description | Reply to the voice connection release request. |
| Parameter 1 | XAIR_RESULT_T *: points to the result of the release request.<br>• XAIR_SUCCESS: The voice connection is now closed. |

Xair_MvDisconnectInd

| | |
|---|---|
| Event | XAIR_MV_DISCONNECT_IND |
| Description | Unsolicited indication of a voice connection failure. |
| Parameter 1 | XAIR_RESULT_T *: points to the reason for the indication.<br>• XAIR_CLOSED: The radio link was closed. |

Xair_MvSampleRateInd

| | |
|---|---|
| Event | XAIR_MV_SAMPLE_RATE_IND |
| Description | Indication of an upstream voice sample rate change.<br>XAIR_RESULT_T *: points to the reason for the indication. |
| Parameter 1 | • |

Request Functions for the Xair Management Service
Xair_MmInitReq

| | |
|---|---|
| Function | XAIR_RESULT_T Xair_MmInitReq ( void ); |
| Execution | Synchronous. |
| Description | • Initializes the API internal resources. |
| Input Parameter | • — |
| Return Value | • XAIR_SUCCESS: Currently no failure case is defined for this operation.<br>• XAIR_BUFFER_FULL: The operation failed because there is no space available to queue the request (API flow control). |

Xair_MmStartReq

| | |
|---|---|
| Function | XAIR_RESULT_T Xair_MmStartReq ( void ); |
| Execution | Asynchronous. |
| Description | • Establishes the communication with the smart transceiver chip and sets up the configuration as defined by the XIB attributes. |
| Input Parameter | • — |
| Return Value | • XAIR_SUCCESS: A start request was initiated.<br>• XAIR_BUFFER_FULL: The operation failed because there is no space available to queue the request (API flow control).<br>• XAIR_CONNECTED: The operation failed because at least one connection is established. Disconnect (or software reset) first. |

Xair_MmResetReq

| | |
|---|---|
| Function | XAIR_RESULT_T Xair_MmResetReq ( void ); |
| Execution | Asynchronous. |
| Description | • Requests a software reset of the smart transceiver chip. |
| Input Parameter | • — |
| Return Value | • XAIR_SUCCESS: A reset request was initiated.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Xair_MmPowerDownReq

| | |
|---|---|
| Function | XAIR_RESULT_T Xair_MmPowerDownReq ( void ); |
| Execution | Asynchronous. |
| Description | • Requests a power down of the smart transceiver chip. |
| Input Parameter | • — |
| Return Value | • XAIR_SUCCESS: A power down request was initiated.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Xair_MmBindReq

| | |
|---|---|
| Function | XAIR_RESULT_T Xair_MmBindReq ( void ); |
| Execution | Asynchronous. |

| | |
|---|---|
| Description | • Requests a binding to a master device. Both devices (master and slave) must be in this state to have a successful binding. An existing binding is valid until the next successful bind request is performed. |
| Input Parameter | • — |
| Return Value | • XAIR_SUCCESS: A bind request was initiated.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Xair_MmStopBindReq

| | |
|---|---|
| Function | XAIR_RESULT_T Xair_MmStopBindReq ( void ); |
| Execution | Asynchronous. |
| Description | • Cancels the request of a binding to a master device. |
| Input Parameter | • — |
| Return Value | • XAIR_SUCCESS: A stop bind request was initiated.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Xair_MmReadReq

| | |
|---|---|
| Function | XAIR_RESULT_T Xair_MmReadReq ( uint16 Offset, uint8 Size, uint16 BackendContext ); |
| Execution | Asynchronous. |
| Description | • Reads data from the EEPROM of the smart transceiver chip. |
| Input Parameter | Offset: addresses the EEPROM area to be read from.<br>Size: defines the number of bytes to read.<br>• BackendContext: defines a context of backend for the request |
| Return Value | • XAIR_SUCCESS: A read request was initiated.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Xair_MmWriteReq

| | |
|---|---|
| Function | XAIR_RESULT_T Xair_MmWriteReq ( uint16 Offset, uint8 Size, uint8 * Data, uint16 BackendContext); |
| Execution | Asynchronous. |
| Description | • Writes data from the EEPROM of the smart transceiver chip. |
| Input Parameter | Offset: addresses the EEPROM area to be written to.<br>Size: defines the number of bytes to write.<br>Data: points to the data to be written.<br>• BackendContext: defines a context of backend for the request |
| Return Value | • XAIR_SUCCESS: A write request was initiated.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Events for the Xair Management Service

Xair_Mmsmart transceiverComReadyInd

| | |
|---|---|
| Event | XAIR_MM_smart transceiver_COM_READY_IND |
| Description | Indication for a ready SPI communication link between the master controller and smart transceiver. It will be generated after a successful run of the SPI autodetection. |

Xair_MmStartConf

| | | |
|---|---|---|
| Event | XAIR_MM_START_CONF | |
| Description | Reply to the start request. | |
| Parameter 1 | XAIR_RESULT_T *: | points to the result of the start request.<br>• XAIR_SUCCESS: The communication to the smart transceiver chip is established and configured.<br>• XAIR_MISCONFIG: The configuration of the smart transceiver chip failed. |
| Parameter 2 | uint8 *: | if successful, points to the return data of the startup message. |
| | • uint16: | SpiProtocolVersion |
| | • uint16: | ChipHardwareVersion |
| | • uint16: | FirmwareVersion |
| | • uint8: | Abilities |
| | • uint16: | StartupGpio |
| | • uint8: | StartupEvent |
| | uint8 *: | if start failure (XAIR_MISCONFIG), points to the return data of the message which is failed. |

Xair_MmResetInd

| | |
|---|---|
| Event | XAIR_MM_RESET_IND |
| Description | Unsolicited indication of an smart transceiver chip reset. |
| Parameter 1 | XAIR_RESULT_T *: points to the reason for the indication. |
| | • XAIR_RESET: The smart transceiver chip reports an (unexpected) reset. |

Xair_MmBindConf

| | |
|---|---|
| Event | XAIR_MM_BIND_CONF |
| Description | Reply to the bind request. |
| Parameter 1 | • XAIR_RESULT_T *: points to the result of the bind request. |
| | • XAIR_SUCCESS: The binding to a (new) master device was successful. |

Xair_MmStopBindConf

| | |
|---|---|
| Event | XAIR_MM_STOP_BIND_CONF |
| Description | Reply to the stop bind request. |
| Parameter 1 | XAIR_RESULT_T *: points to the result of the bind request. |
| | • XAIR_SUCCESS: The binding was stopped. |

Xair_MmReadConf

| | |
|---|---|
| Event | XAIR_MM_READ_CONF |
| Description | Reply to the read request. |
| Parameter 1 | uint16 *: points to the offset in the EEPROM. |
| Parameter 2 | uint8 *: points to the length of the data which are read out (0 if an error occurred). |
| Parameter 3 | Uint16 *: points to the backend context. |
| Parameter 4 | uint8 *: points to the data which are read out. The length is given by Parameter 2. |

Xair_MmWriteConf

| | |
|---|---|
| Event | XAIR_MM_WRITE_CONF |
| Description | Reply to the write request. |
| Parameter 1 | • uint16 *: points to the offset in the EEPROM. |
| Parameter 2 | uint16 *: points to the backend context. |
| Parameter 3 | uint8 *: points to the status of writing the data |
| | - 0, successful |
| | - 1, not written outstanding request already being processed |
| | - 2, address error |
| | - 3, write error hardware access failed |
| | - 4, validation error written data not equal to read back data |
| Parameter 4 | uint8 *: points to the data that were written. |

Xair_MmSyncInd

| | |
|---|---|
| Event | XAIR_MM_SYNC_IND |
| Description | Indicates a wireless frame sync event. The frame sync position can be setup in the xair_api_xib.h with the define XIB_SYNC_EVENT_POSITION. |
| | - SYNC_EVENT_OFF |
| | - SYNC_EVENT_FRAMESTART |
| | - SYNC_EVENT_BROADCAST |
| | - SYNC_EVENT_RX_FINISHED |

Request Functions for the Xair GPIO Service

Xair_MgIoReq

| | |
|---|---|
| Function | XAIR_RESULT_T Xair_MgIoReq ( uint16 OutputClearMask, uint16 OutputSetMask ); |
| Execution | Asynchronous. |
| Description | Changes the GPIO output pins of the smart transceiver chip and requests the current input pin state. |
| Input Parameter | OutputClearMask: 16 bit, little-endian, bit cleared means ignore, bit set means clear this output pin. |
| | OutputSetMask: 16 bit, little-endian, bit cleared means ignore, bit set means set this output pin. |
| Return Value | • XAIR_SUCCESS: The IO request was initiated. |
| | • XAIR_BUFFER_FULL: The operation failed because there is no space available to queue the request (API flow control). |
| | • XAIR_NOT_AVAILABLE: The operation failed because the communication to the smart transceiver chip is not established and configured. |

Events for the Xair GPIO Service

Xair_MgIoConf

| | |
|---|---|
| Event | XAIR_MG_IO_CONF |
| Description | Reply to the GPIO setup request. |
| Parameter 1 | XAIR_RESULT_T *: points to the result of the setup request. |
| | • XAIR_SUCCESS: The GPIO setup was successful. |
| | • XAIR_NOT_AVAILABLE: The communication to the smart transceiver chip failed. |
| Parameter 2 | uint16 *: points to the GPIO state (little-endian, both input and output pin states are included). |

Xair_MgIoInd

| | |
|---|---|
| Event | XAIR_MG_IO_IND |
| Description | Unsolicited indication of the GPIO state when a relevant change (see interrupt mask in XIB) has occurred.. |
| Parameter 1 | uint16 *: points to the GPIO state (little-endian, both input and output pin states are included). |

Xair_MpSendRawSpiDataReq

| | |
|---|---|
| Function | XAIR_RESULT_T Xair_MpSendRawSpiDataReq ( uint8 *Data ); |
| Execution | Asynchronous. |
| Description | Send direct an unformatted SPI message to the smart transceiver wireless transceiver via the SPI communication interface. |
| Input Parameter | Data:     Pointer to the SPI message |
| Return Value | • XAIR_SUCCESS: Send raw spi data request successful.<br>• XAIR_BUFFER_FULL: The operation failed because there is no space available to queue the request (API flow control).<br>• XAIR_NOT_AVAILABLE: The operation failed because the communication to the smart transceiver chip is not established and configured. |

Event and Buffer Handling Functions

Xair_GetEvent

| | |
|---|---|
| Function | XAIR_EVENT_T Xair_GetEvent ( void ); |
| Execution | Synchronous. |
| Description | Checks for an event from the API to feed the next cycle of the application event loop. |
| Input Parameter | — |
| Return Value | • XAIR_NULL_EVENT: No event available.<br>• XAIR_M...: The respective API event occurred. |

Xair_ReadEventDetails

| | |
|---|---|
| Function | XAIR_RESULT_T Xair_ReadEventDetails ( POINTER_T * Param1, POINTER_T * Param2, POINTER_T * Param3, POINTER_T * Param4 ); |
| Execution | Synchronous. |
| Description | Reads the event details from the internal buffers of the API. The parameters returned (i.e. the internal buffers and the pointers to them) are valid until Xair_GetEvent is called again. |
| Output Parameter | Param1:   points to the first parameter of the most recent event upon successful function completion. The data type POINTER_T is a generic pointer type (void*) which must be cast to the data type needed to access the event parameter.<br>Param2, Param3, Param4:   return more parameters as needed for the event. NULL if no parameter is defined for the corresponding event |
| Return Value | • XAIR_SUCCESS: The event parameters were written into buffers and the pointers to them were returned. The buffers and pointer values are valid until the next call of Xair_GetEvent.<br>• XAIR_NOT_AVAILABLE: No event available. This happens for example if Xair_GetEvent either returned XAIR_NULL_EVENT or was never called. |

Xair_PutVoiceBuffer

| | |
|---|---|
| Function | XAIR_RESULT_T Xair_PutVoiceBuffer ( POINTER_T * NextTxBuff); |
| Execution | Synchronous. |
| Description | Provide a pointer to a free Tx voice buffer to fill with sampled audio data. The function calls must be synchronized with the wireless transmission frame timing (e.g. via an external frame sync HW signal or XAIR_MV_RX_TX_IND). Releases the previous Tx voice buffer, the respective pointer is invalid afterwards. Schedules the current transmit buffer (provided with the previous call to this function) for transmission, the respective pointer must not be used anymore by the application. Note: The first call of this function after reset returns the pointer without releasing a voice buffer). |
| Output Parameter | NextTxBuff: points to the voice data buffer that the application (audio handler) should fill until the next call of Xair_ PutVoiceBuffer( ). The buffer size is determined by the voice service setup (XIB).. |
| Return Value | • XAIR_SUCCESS: A next voice transmit buffer is available. The previous buffer is released (note: the first call of this function after reset returns the pointer without releasing a voice buffer).<br>• XAIR_VOICE_SYNC: Function calls and the wireless transmission frame timing are out of synchronization. Next transmit buffer is not available or to less transmit buffer ready for transfer to smart transceiver chip. In this case the respective pointer have a NULL value. If this happens the voice sample rate is to slow/fast regarding the wireless frame. So the function calling rate is to slow/fast.<br>• XAIR_CLOSED: The operation failed because the voice connection is closed. |

Xair_GetVoiceBuffer

| | | |
|---|---|---|
| Function | XAIR_RESULT_T Xair_GetVoiceBuffer | ( POINTER_T * RxBuff, uint8 * CrcStatus ); |
| Execution | Synchronous. | |
| Description | Provide a pointer to a Rx voice buffer, which is received by the smart transceiver chip. The function calls must be synchronized with the wireless transmission frame timing (e.g. via an external frame sync HW signal or XAIR_MV_RX_TX_IND). Releases the previous Rx voice buffer, the respective pointer is invalid afterwards. Note: The first call of this function after reset returns the pointer without releasing a voice buffer). | |
| Output Parameter | RxBuff: must point to a variable that will be assigned a pointer to the voice data buffer which holds the received downstream voice data. The buffer size is determined by the voice service setup (XIB). | |
| | CrcStatus: returns the CRC status of the Rx voice data buffer, which is given by RxBuff. | |
| Return Value | • XAIR_SUCCESS: A next voice transmit buffer is available. The previous buffer is released (note: the first call of this function after reset returns the pointer without releasing a voice buffer). | |
| | • XAIR_VOICE_SYNC: Function calls and the wireless transmission frame timing are out of synchronization. Next received buffer is not available or a buffer overflow was occured. In this case the respective pointer have a NULL value. If this happens the voice sample rate is to slow/fast regarding the wireless frame. So the function calling rate is to slow/fast. | |
| | • XAIR_CLOSED: The operation failed because the voice connection is closed. | |

Configuration and Design of the API

All configuration of the API may be done with defines in "xair_api_xib.h" header file. Here the complete API may be adjustable regarding the available resources in the master control application system.

The number of buffer for queuing RX/TX data are adjustable by the parameter
XIB_TX_DATA_QUEUE_SIZE
XIB_EVENT_QUEUE_SIZE
XIB_RX_DATA_QUEUE_SIZE
So you can adjust the used queue sizes regarding the available memory space of the master control application system.

The used eeprom type and storage size is configurable with
XIB_EEPROM_TYPE
XIB_PERSISTENT_STORE_SIZE
The SPI mode is set with
XIB_SPI_MODE
You can set mode 0 . . . 3. Default is SPI mode 0.

The frequency of the output clock which is provided by the smart transceiver chip can be set with
XIB_PROVIDED_CLOCK_FREQUENCY
You can set the clock to 12, 24 or 48 MHz. Default is 12 MHz.

The working application type is set with
XIB_APPLICATION_TYPE
You can set Data, Voice or Both. Default is Data.

The ability of an integrated voice device is set with
XIB_VOICE_ABILITY
You can set Enable or Disable. Default is Enable.

The position of the frame sync message generated by the smart transceiver can be adjusted with
XIB_SYNC_EVENT_POSITION You can set SYNC_EVENT_OFF, SYNC_EVENT_FRAMESTART, SYNC_EVENT_BROADCAST or SYNC_EVENT_RX_FINISHED.
Default is SYNC_EVENT_FRAMESTART.

The used upstream voice encoding type is set with
XIB_UPSTREAM_VOICE_ENCODING_TYPE
The generation of a voice sync message can be set with
XIB_VOICE_SYNC
You can set Enable or Disable. Default is Enable.

The initial GPIO settings of the smart transceiver chip can be set with
XIB_GPIO_INPUTS
/**<16 bit, little-endian, bit cleared means ignore, bit set means is input */
XIB_GPIO_INTERRUPT_MASK
/**<16 bit, little-endian, bit cleared means ignore, bit set means Xair_MgIoInd events are received on input changes */
XIB_GPIO_OUTPUTS
/**<16 bit, little-endian, bit cleared means ignore, bit set means this bit is an output */
XIB_GPIO_OUTPUT_TYPE
/**<16 bit, little-endian, bit cleared means this is push/pull, bit set means this is open drain */
XIB_GPIO_OUTPUT_INIT
/**<16 bit, little-endian, initial output state */
XIB_GPIO_INPUT_TYPE
/**<32 bit, Configure GPIO input pins Two bit pairs of the field are used to define each GPIO pin */
An equal size of the data and voice packet buffers is set with
XIB_VOICE_EQ_DATA_BUFFER
You can set TRUE or FALSE. Default is TRUE.
Xair API functions (xair_api.h)

```
/* API typedefs for XAIR_EVENT_T */
typedef enum
{
    XAIR_NULL_EVENT,                              /**< no event available */
    XAIR_MM_ smart transceiver_COM_READY_IND,     /**< smart transceiver / Master SPI
communication ready indication (after autodection) */
```

```
    XAIR_MM_START_CONF,                             /**< start request finished */
    XAIR_MM_RESET_IND,                              /**< reset occurred */
    XAIR_MM_BIND_CONF,                              /**< bind request finished */
    XAIR_MM_STOP_BIND_CONF,                         /**< stop bind request finished */
    XAIR_MM_READ_CONF,                              /**< smart transceiver eeprom read finished */
    XAIR_MM_WRITE_CONF,                             /**< smart transceiver eeprom write finished
*/
    XAIR_MM_SYNC_IND,                               /**< indicates the wireless frame sync message
*/
    XAIR_MD_CONNECT_CONF,                           /**< data connect request finished */
    XAIR_MD_DISCONNECT_CONF,                        /**< data disconnect request finished */
    XAIR_MD_DISCONNECT_IND,                         /**< data connection released */
    XAIR_MD_DATA_IND,                               /**< data received */
    XAIR_MV_CONNECT_CONF,                           /**< voice connect request finished */
    XAIR_MV_DISCONNECT_CONF,                        /**< voice disconnect request finished */
    XAIR_MV_DISCONNECT_IND,                         /**< voice connection released */
    XAIR_MV_SAMPLE_RATE_IND,                        /**< sample rate change indication */
    XAIR_MV_RX_TX_IND,                              /**< indicates the voice packet
synchronisation */
    XAIR_MG_IO_CONF,                                /**< gpio setup request finished */
    XAIR_MG_IO_IND,                                 /**< unsolicited indication of the GPIO state
*/
    XAIR_MP_PROTEST_CONF,                           /**< production test command request finished
*/
}XAIR_EVENT_T;                                      /**< typedef enum for XAIR API events */
/* API typedefs for XAIR_RESULT_T */
typedef enum
{
    XAIR_SUCCESS,                                   /**< request successful */
    XAIR_ERROR,                                     /**< request error */
    XAIR_CLOSED,                                    /**< connection is (unexpectedly) closed */
    XAIR_NOT_AVAILABLE,                             /**< smart transceiver chip not available */
    XAIR_MISCONFIG,                                 /**< smart transceiver configuration failed */
    XAIR_CONNECTED,                                 /**< smart transceiver chip connection is
already established */
    XAIR_RESET,                                     /**< reset occurred */
    XAIR_BUFFER_FULL,                               /**< buffer is full */
    XAIR_VOICE_SYNC,                                /**< voice packet rate is out of sync */
}XAIR_RESULT_T;                                     /**< typedef enum for XAIR API results */
/* API primitives of the Xair layer management service */
XAIR_RESULT_T                   Xair_MmInitReq              ( void );
XAIR_RESULT_T                   Xair_MmStartReq             ( void );
XAIR_RESULT_T                   Xair_MmResetReq             ( void );
XAIR_RESULT_T                   Xair_MmPowerDownReq         ( void );
XAIR_RESULT_T                   Xair_MmBindReq              ( void );
XAIR_RESULT_T                   Xair_MmReadReq              ( uint16 Offset, uint8 Size, uint16
                                                              BackendContext );
XAIR_RESULT_T                   Xair_MmWriteReq             ( uint16 Offset, uint8 Size, uint8
*Data,
                                                               uint16 BackendContext );
/* API primitives of the Xair layer data service */
XAIR_RESULT_T                   Xair_MdDataReq              ( XAIR_UP_PACKET_TYPE_T PacketType,
                                                              uint8 *Data );
XAIR_RESULT_T                   Xair_MdConnectReq           ( uint8 *Data );
XAIR_RESULT_T                   Xair_MdDisconnectReq        ( void );
/* API primitives of the Xair layer voice service */
XAIR_RESULT_T                   Xair_MvConnectReq           ( uint8 *Data );
XAIR_RESULT_T                   Xair_MvDisconnectReq        ( void );
/* API primitives of the Xair layer gpio service */
XAIR_RESULT_T                   Xair_MgIoReq                ( uint16 OutputClearMask,
                                                              uint16 OutputSetMask );
XAIR_RESULT_T                   Xair_MpSendRawSpiData       ( uint8 *Data );
/* API event functions */
XAIR_EVENT_T                    Xair_GetEvent               ( void );
XAIR_RESULT_T                   Xair_ReadEventDetails       ( POINTER_T *Param1, POINTER_T
*Param2,
                                                              POINTER_T *Param3, POINTER_T *Param4
                                                            );
XAIR_RESULT_T                   Xair_PutVoiceBuffer         ( POINTER_T *NextTxBuff );
XAIR_RESULT_T                   Xair_GetVoiceBuffer         ( POINTER_T *RxBuff,
                                                              uint8 *CrcStatus);
/* API debug and trace functions */
XAIR_RESULT_T                   Xair_DbgEnable              ( uint8 Level );
XAIR_RESULT_T                   Xair_DbgSetLevel            ( uint8 Level );
XAIR_RESULT_T                   Xair_DbgPrint               ( uint8 *DebugMessage, uint8
Length);
XAIR_RESULT_T                   Xair_DbgDisable             ( void );
/* API functions for SPI driver */
void Xair_Spi2XairTxReady                                   ( XAIR_SPI_FRAME_TYPE_T Type );
bool Xair_Xair2SpiGetRx                                     ( uint8 xdata* *address, XAIR_SPI_FRAME_TYPE_T
```

```
Type );
void Xair_Spi2XairRxReady                              ( XAIR_SPI_FRAME_TYPE_T Type );
/* process of the Xair API, has to be called periodically to handle new
requests or rx spi messages*/
void Xair_Api_State_Machine_Handler                    ( void );
Xair Information base (xair_api_xib.h)
/**< Size of the request/spi tx message queue (each entry allocates 35/67
bytes of memory). Valid parameters are 1, 2, 4, 8, . . . */
#define XIB_TX_DATA_QUEUE_SIZE                         2
/**< Size of the event queue (each entry allocates 18 bytes of memory). Valid
parameters are 1, 2, 4, 8, . . .*/
#define XIB_EVENT_QUEUE_SIZE                           2
/**< Size of the spi rx data queue (each entry allocates 35/67 bytes of
memory). Valid parameters are 1, 2, 4, 8, . . .*/
#define XIB_RX_DATA_QUEUE_SIZE                         2
/**< Persistent storage size (EEPROM length). */
#define XIB_PERSISTENT_STORE_SIZE                      0x0200
/**< SPI protocol version. Protocol to access the smart transceiver chip. */
#define XIB_SPI_PROTOCOL_VERSION                       0x0100
/**< SPI mode ( 0, 1, 2, 3 ) */
#define XIB_SPI_MODE                                   0
/**<Clock frequency provided by smart transceiver chip in MHz (12, 24 or
48(host only)). */
#define PROVIDED_CLOCK_12                              0x00
#define PROVIDED_CLOCK_24                              0x01
#define PROVIDED_CLOCK_48                              0x02
#define XIB_PROVIDED_CLOCK_FREQUENCY                   PROVIDED_CLOCK_12
/**< Application type (data, voice, data and voice). */
#define APPLICATION_TYPE_DATA                          0x01
#define APPLICATION_TYPE_VOICE                         0x02
#define APPLICATION_TYPE_BOTH                          0x03
#define XIB_APPLICATION_TYPE                           APPLICATION_TYPE_DATA
/**< XIB_VOICE_ABILITY: Integrated Voice ability. */
#define VOICE_ABILITY_ENABLE                           0x40
#define VOICE_ABILITY_DISABLE                          0x00
#define XIB_VOICE_ABILITY                              VOICE_ABILITY_ENABLE
/**< Position for Sync event message in correlation to the wireless frame.*/
#define SYNC_EVENT_OFF                                 0x00
#define SYNC_EVENT_FRAMESTART                          0x01
#define SYNC_EVENT_BROADCAST                           0x02
#define SYNC_EVENT_RX_FINISHED                         0x03
#define XIB_SYNC_EVENT_POSITION                        SYNC_EVENT_FRAMESTART
/**< Voice coding by smart transceiver chip */
#define VOICE_CODING_DISABLE                           0x00
#define VOICE_CODING_ENABLE                            0x01
#define XIB_VOICE_CODING                               VOICE_CODING_ENABLE
/**< Upstream & downstream voice packet size (32, 64 byte) */
#define VOICE_PACKET_SIZE_64                           0x00
#define VOICE_PACKET_SIZE_32                           0x01
#if (XIB_VOICE_CODING == VOICE_CODING_ENABLE)
    #define XIB_VOICE_PACKET_SIZE                      VOICE_PCM_PACKET_SIZE_32
#else
    #define XIB_VOICE_PACKET_SIZE                      0x01
#endif
/**< enable/disable voice sync message (note: the example spi driver needs
the voice sync!!!) */
#define VOICE_SYNC_DISABLE                             0x00
#define VOICE_SYNC_ENABLE                              0x01
#define XIB_VOICE_SYNC                                 VOICE_SYNC_ENABLE
/**< GPIO inputs, 16 bit, little-endian, bit cleared means ignore, bit set
means is input. */
#define XIB_GPIO_INPUTS                                0x0000
/**< GPIO interrupt mask, 16 bit, little-endian, bit cleared means ignore,
bit set means Xair_MgIoInd events are received on input changes. */
XIB_GPIO_INTERRUPT_MASK                                0x0000
/**< GPIO outputs, 16 bit, little-endian, bit cleared means ignore, bit set
means this bit is an output. */
XIB_GPIO_OUTPUTS                                       0x0000
/**< GPIO output type, 16 bit, little-endian, bit cleared means this is
push/pull, bit set means this is open drain. */
XIB_GPIO_OUTPUT_TYPE                                   0x0000
/**< GPIO output initialization, 16 bit, little-endian, initial output state.
*/
XIB_GPIO_OUTPUT_INIT                                   0x0000
/**< 32 bit, Configure GPIO input pins Two bit pairs of the field are used to
define each GPIO pin */
#define XIB_GPIO_INPUT_TYPE                            0x05555555
/**< Voice and data buffer has the same length (TRUE, FALSE) */
#define XIB_VOICE_EQ_DATA_BUFFER                       TRUE
```

What is claimed:

1. A method of providing access to a wireless protocol processor using an application programming interface (API), comprising:
communicating with said wireless protocol processor via a serial peripheral interface (SPI) driver;
synchronizing power modes and functional states between an application and said wireless protocol processor; and
coordinating wireless data and voice transmission functions of said application, said API being configured to allow for setup of the wireless protocol processor, provide a framework to support said synchronizing, and provide a framework for debugging communication between the application and the wireless protocol processor.

2. The method according to claim 1, further comprising providing a data service to transmit and receive fixed size data packets via a wireless link, a voice service to transmit and receive voice packets via said wireless link, a layer management service to configure parameters of other services, and a GPIO service to perform bit oriented IO on spare pins of the wireless protocol processor.

3. The method according to claim 2 wherein said data service further comprises service primitives, said service primitives further comprising request primitives, indication primitives, confirm primitives, and response primitives.

4. The method according to claim 1, further comprising accessing an information database comprising API parameters and configuration values.

5. A system for providing access to a wireless protocol processor using an application programming interface (API), the system comprising:
a computing device comprising at least one processor;
a memory communicatively coupled to said processor when said system is operational;
said memory having stored therein computer instructions that upon execution by the at least one processor cause:
communicating with said wireless protocol processor via a serial peripheral interface (SPI) driver;
synchronizing power modes and functional states between an application and said wireless protocol processor; and
coordinating wireless data and voice transmission functions of said application, said API being configured to allow for setup of the wireless protocol processor, provide a framework to support said synchronizing, and provide a framework for debugging communication between the application and the wireless protocol processor.

6. The system according to claim 5, further comprising providing a data service to transmit and receive fixed size data packets via a wireless link, a voice service to transmit and receive voice packets via said wireless link, a layer management service to configure parameters of other services, and a GPIO service to perform bit oriented IO on spare pins of the wireless protocol processor.

7. The system according to claim 6 wherein said data service further comprises service primitives, said service primitives further comprising request primitives, indication primitives, confirm primitives, and response primitives.

8. The system according to claim 5, further comprising accessing an information database comprising API parameters and configuration values.

9. A computer readable storage medium storing thereon computer executable instructions for providing access to a wireless protocol processor using an application programming interface (API), the computer readable storage medium comprising:
instructions for communicating with said wireless protocol processor via a serial peripheral interface (SPI) driver;
instructions for synchronizing power modes and functional states between an application and said wireless protocol processor; and
instructions for coordinating wireless data and voice transmission functions of said application, said API being configured to allow for setup of the wireless protocol processor, provide a framework to support said synchronizing, and provide a framework for debugging communication between the application and the wireless protocol processor.

10. The computer readable storage medium according to claim 9, further comprising instructions for providing a data service to transmit and receive fixed size data packets via a wireless link, a voice service to transmit and receive voice packets via said wireless link, a layer management service to configure parameters of other services, and a GPIO service to perform bit oriented IO on spare pins of the wireless protocol processor.

11. The computer readable storage medium according to claim 10 wherein said data service further comprises service primitives, said service primitives further comprising request primitives, indication primitives, confirm primitives, and response primitives.

12. The computer readable storage medium according to claim 9, further comprising instructions for using an information database comprising API parameters and configuration values.

* * * * *